United States Patent [19]

Trout

[11] Patent Number: 5,566,349
[45] Date of Patent: Oct. 15, 1996

[54] COMPLEMENTARY CONCURRENT COOPERATIVE MULTI-PROCESSING MULTI-TASKING PROCESSING SYSTEM USING SHARED MEMORIES WITH A MINIMUM OF FOUR COMPLEMENTARY PROCESSORS

[76] Inventor: Ray C. Trout, 12126 Palm Way, Houston, Tex. 77034

[21] Appl. No.: 243,174

[22] Filed: May 16, 1994

[51] Int. Cl.⁶ .............................. G06F 15/16; G06F 13/14
[52] U.S. Cl. .................... 395/840; 395/827; 395/841; 395/475; 395/800; 364/243; 364/245.5; 364/245.7; 364/245.6; 364/245.9
[58] Field of Search ...................................... 395/821, 840, 395/800, 841, 827, 475; 364/243, 245.5, 245.6, 245.7, 245.9

[56] References Cited

U.S. PATENT DOCUMENTS

| | | | |
|---|---|---|---|
| 5,016,166 | 5/1991 | Van Loo et al. | 364/200 |
| 5,113,500 | 5/1992 | Talbott et al. | 395/325 |
| 5,257,372 | 10/1993 | Furtney et al. | 395/650 |
| 5,307,485 | 4/1994 | Bordonaro et al. | 395/600 |
| 5,317,693 | 5/1994 | Cuenod et al. | 395/275 |
| 5,402,350 | 3/1995 | Kline | 364/468 |
| 5,450,581 | 9/1995 | Bergen et al. | 355/600 |

OTHER PUBLICATIONS

Arthur, Lowell Jay, Improving Software Quality, 1993, Table of Contents.
Arthur, Lowell Jay, Improving Software Quality, 1993, Chap. 13: Rapid Evolutionary Devel.
IBM Dictionary of Computing, Aug. 1993 Preface.
Booch, Grady, Object Oriented Design With Applications, 1991, Table Content.
Connell et al, Structured Rapid Proto Typing, 1989, Table of Contents.
Yourdon, Edward, Decline and Fall of the American Programmer, 1992, Table Content.

*Primary Examiner*—Thomas C. Lee
*Assistant Examiner*—Rehana Perveen Krick
*Attorney, Agent, or Firm*—John R. Casperson

[57] ABSTRACT

The system concept of the C3M2 System is to have the capability of providing a Processor for each major processing step of automated data processing, i.e. if you have four steps then you need a minimum of four but it could be 8 or 12 or 16 processors. The four major complementary functions encompass the four major functions of data processing (Input/Output, Data Computation, Storage and User I/F). The system shall be Multi-tasking for each step. Source headers, link lists and entity or object identifiers are the methods that shall be used for identity of the different classes, types and objects for the variety of data in the system. The source and data type are contained in the source header. The class and type identity are contained in the object identifiers. The multi-tasking would be by schedule (interleaved by priority). This was selected instead of cycle sharing for improved concurrency.

32 Claims, 22 Drawing Sheets

COMPLEMENTARY CONCURRENT COOPERATIVE MULTI-PROCESSING MULTI-TASKING PROCESSING SYSTEM USING SHARED MEMORIES WITH A MINIMUM OF FOUR COMPLEMENTARY PROCESSORS

BACKGROUND OF THE INVENTION

This invention is a methodology for configuring complementary data processors to: operate in concert; have reduced applications and operating system software, perform concurrent cooperative multi-processing multi-tasking operations, have over 1000% improvement in performance and have outstanding implementation cost.

The following references were a part of the literature study undertaken during the 1992 and 1993 time frame during the invention period.

1. Structured Rapid Prototyping, John L. Connell and Linda Shafer, 1989 Prentice-Hall, Englewood Cliffs, N.J.
2. Improving Software Quality, Lowell Jay Aurthur, 1993 John Wiley & Sons, New York, N.Y.
3. Object-Oriented Design with Applications, Grady Booch, 1991 Benjamin/Cummings Publishing, Redwood City, Calif.
4. Decline and Fall of the American Programmer, Edward Yourdom, 1992 Prentice-Hall, Englewood Falls, N.J.
5. Pentium Processor Users Manual, Vol 3, Architecture and Programmers Manual, Intel Literature, PO Box 7641, Mt. Prospect, Ill.
6. Alpha Architecture Reference Manual, Richard L. Sites, Digital Press, Maynard, Mass.
7. Inside SCO UNIX, Steve Glines, Peter S. Spicer, Benjamin A. Hunsberger, Karen Lynn White, 1992 New Rider Publishing, Carmel, Ind. 46032
8. Guide Real-Time Programming, POSIX 1003.4, Digital Equipment Corp., Maynard, Mass.
9. Sable Systems Overview, Digital Equipment Corp., Maynard, Mass.
10. SEI Documents, Software Engineering Institute, Annotated Listing of Documents, 1993 Carnegie Mellon University, Pittsburgh, Pa. 15213
11. IBM Dictionary of Computing, ISBN 0-07-113383-6, 10th Edition (August 1993) McGraw-Hill, New York, N.Y.

Multi-Tasking and Multi-Processing are tasks that cost software developers millions of hours in development time. The major problem is using the sequential processing Operating system and invoking interrupts while attempting to resolve multi-process requirements. Current system throughput is effected by the Overhead required by the Operating system of the platform, >50%. The time delays are due to interrupts, context switching, exceptions and wait states. Schedulers and Priority Allocations also use interrupts and context switching for accomplishment of their tasks. Concurrency and Cooperative Processing normally uses clock sharing, wait states or multi-processors to achieve their objectives. Current system procedures and operational procedures must be revised through a planned methodology that accomplishes the same objective with simpler steps and in much less time.

The number of processors used in a system requires special Software modifications for Multiple parallel processing or Symmetric processing. Multiple parallel processing does not work well when the number of processors is less than 10. However, Symmetric processing does not work well when the number of processors is more than 10 due to operating system problems and allocations of memory. The Multiple parallel processing divides one large task into N tasks. Symmetric processing divides a number of tasks into equal work load tasks. This causes multi-processing problems for the Operating system. Multi-tasking is very difficult for the Multiple parallel processing configuration but can be segregated to one task per processor in the symmetric configuration. The processes must perform multi-tasking of all types with simpler methodology. Concurrent operations are normally handled by sharing clock cycles, 1/N, or assigning one processor for each task. Cooperative processing normally uses Wait-States or FIFO modes of operations. They normally add to the Overhead of the Operating system. Single, MMP or Symmetric configurations do not have Complementary processing. Complementary Processing (CP) capabilities need to be added to the system. Complementary Processing will allow Multi-Processing with much lower Software Overhead, far simpler operations, reduced design costs and Software design time.

Real Time Kernels are normally used for Real Time or Embedded Systems. These kernels still use Interrupts and Context Switching. The Real Time Kernel can also be preempted by the System Operating system. The operating performance of the Real Time Kernel is about the same as the System Operating system but it restricts performance to tasks in the kernel. The overall operating time is about the same for the Real Time Kernel as for the System Operating system. There are no outside interferences for the Real Time Kernel except in the case of Preemption. The Real Time Kernel was analyzed, but could not be used due to the system constraints of its operating procedures. The Real Time operating system needs to be designed in a manner that will reduce its operating time by 50 or 60 percent (no Interrupts or Context Switching). Data drivers for the Applications Programs (AP) are also scheduled by the Operating system. These data drivers are for the disk system, interim buffers, input/output for the interim buffers and the AP, display generators and other associated AP's. These data drivers are separate drivers and are handled sequentially. These steps are lengthy and should be reduced to simple memory transfers, without interim buffers and done concurrently.

Allocation of memory is normally made at compile time, by Operating system allocations and other dedicated memory tasks. Applications programs normally use memory allocations from disk swapping and other memory requirements from virtual memory. Virtual memory is also used for storage of processed data from the applications programs. The cost of memory has declined during the preceding years and the philosophy needs to change for allocations of memory. There should be less disk swapping, more dedicated memory, more processed data in dedicated memory and more Real Time operations using dedicated memory.

The Von Naumann architecture, still currently in use, was for a single computer with limited memory. Software design personnel still use this architecture in all of their designs. Design problems are effected by this architecture and primarily due to the computer implementations by the computer manufacturers in order to use existing Software. The design problems are normally dealt with by an Ad Hoc Group (from the SEI of Carnegie Mellon University reference data source) and the individual problems are treated as separate entities. This is a case-by-case basis versus a standards basis. The design must mitigate a large number of problems by eliminating their causes.

System Configurations are normally dependent on the platform and its Operating system. The external interfaces are normally Commercial-off-the-shelf (COTS) or custom design. The system throughput is normally limited by the disk data rates or the internal bus structure. These two factors must be independent of the system throughput. The system should not be limited by External IO rates, Disk Data rates or system bus rates. Internal system interfaces and/or protocols are also factors which can complicate or limit throughput or data input rates. These interfaces must also be independent and accomplished in the simplest fashion on known data types and in the largest feasible data blocks. System Operations are normally planned by the Data base administrator or his System Guru equivalent. The repeatability from one system to another may be similar but normally does not follow published procedures that were initiated during systems implementation and testing but are a result of prior lessons learned. System procedures for System Configuration must be available from the prototyping system testing, must be standardized, and must be used for all future systems.

The majority of real-time CPU's do not have facilities for a Knowledgebase (KB), a data archive facility, a Relational data base with its real-time memory, Displays, or User Graphic user interface interfaces. The components for these facilities need to be added and integrated with the system.

OBJECTS OF THE INVENTION

The C3M2 system methodology can be utilized with a single processor or a many tiered system configuration. The system can operate in series, parallel or both. The processors of the system are loosely coupled. All processes are encapsulated with only data inputs and data outputs. The system is independent of Equipment Components, Operating Systems, Data Bases and Languages. The C3M2 system uses COTS hardware mostly COTS Software. The Costs (Implementation and Life cycle cost) versus Computing Power is very low when compared to current methods of computation. Modification, updates or changes to any process are isolated to the process being modified and do not affect other processes. The system can be reconfigured by the user without changes to the equipment or Software. The C3M2 system can operate in a Distributed data base management system environment with Remote data accesses. The operating systems (Concerted Operating Systems) are much simpler than current Operating systems and with much less Overhead. The system gracefully supports Multi-Processing and Multi-Tasking in a concurrent and cooperative manner. The system supports a multi-user interface and responds to Real-Time/Critical-Time requirements. The systems computational capacity can vary from 1.6 GigaFlops to a large number of Gigaflops. The software complexity does not increase. The systems availability is outstanding and with its fault tolerant capability the reliability of the large systems is as good as the minimum baseline systems. This is a big advancement in software technology.

SUMMARY OF THE INVENTION

In one embodiment of the invention, a computer system comprises four processors, four memories, and a set of instructions for each processor. An IO processor receives data inputs and processes the data inputs to provide data outputs. A DP processor performs a data processing function. A DM processor performs a data distribution function. A DS processor performs a data storage function. At least one memory means is provided for storing data from the IO processor. A dedicated DP memory is provided for storing data from the DP processor. A dedicated DM memory is provided for storing data from the DM processor. A dedicated DS memory is provided for storing data from the DS processor. IO instructions and means for causing the IO processor to transfer data outputs to the at least one memory means for storage are provided in the IO processor. DP instructions and means for causing the DP processor to retrieve data from the at least one memory, process the data to form calculated data; and transfer the calculated data to the DP memory for storage are provided in the DP processor. DM instructions and means for causing the DM processor to retrieve data from the DS memory and to transfer the data retrieved to the DM memory for storage are provided in the DM processor. DS instructions and means for causing the DS processor to retrieve data from at least one of the memory means for storing data from the IO processor and the DP memory and to transfer the retrieved data to the DS memory for storage are provided in the DS processor.

Computer system design is simplified by complementary processors which allow concurrent operations. Multi-tasking and multi-processing is solved by using multi-processors in a Complementary manner. The dissection and solving of design and maintenance problems is much simpler with the Complementary design where each function is independent. Lock and Unlock functions are avoided by only one processor writing to and the other processors reading from any specific data files. The customers are much better served by the system, because it is independent of Platforms, Operating Systems and Languages for excellent system interoperability. The customer also has an excellent economic advantage; i.e., the platforms considered are economical, high speed Reduced instruction computing or PC type processors and not Mainframe, Medium Range or Mini Processors. The complete Command Control System or Transaction System can respond to any user requests in a much simpler fashion and in a far shorter time. Complementary Processing will also allow the system to perform its functions with less hardware and far less Software.

Complementary Processing will contribute significant improvements to information processing. This design methodology not only gracefully allows multi-processor implementation but also contributes to multiple-instruction-issue implementation through concurrent operations and reduced Overhead.

In a further preferred embodiment of the invention, the IO instructions include a routine for assigning a processing priority designator to data inputs and a routine for scheduling the data inputs for ordered transmission to the DP processor in a priority scheduler having a cyclic unvarying predetermined priority designator sequence. The method of using interleaving instead of Interrupts and Context Switching for changing classes of tasks also provide a significant improvement in performance.

In a further embodiment of the invention, there is provided the invention of Complementary Processing. In Complementary Processing the four major complementary functions encompass the four major functions of data processing (Input/Output, Data Computation, Storage and User I/F). This allows each process to be encapsulated, in a similar manner as a module in Ada. This decoupling of processes significantly reduces the software design and maintenance.

The Complementary Processing of the present invention can be summarized as follows, A data input is received in an IO processor. The data input is processed in the IO processor and an IO output is produced. The IO output is transferred to an IO memory for storage. The IO output is preferably also transferred to a DP cache memory for storage, for faster pickup by the DP processor. The IO memory output is retrieved from the IO memory. The retrieved IO memory output is received in a DS processor. The received IO memory output is processed in the DS processor and a DS output is produced. The DS output is transferred to a DS memory for storage. A DP cache memory output is retrieved from the DP cache memory. The DP cache memory output is received in a DP processor. The received DP cache memory output is processed in the DP processor and a DP output is produced. The DP output is transferred to the DP cache memory. The DP output is transferred to a DP memory for storage. A DP memory output is retrieved from the DP memory. The retrieved DP memory output is received in a DS processor. The received DP memory output is processed in the DS processor and a DS output is produced. The DS output is transferred to the DS memory for storage. The DS memory output is retrieved from the DS memory. The retrieved DS memory output is received in a DM processor. The received DS memory output is processed in the DM processor and DM output is produced. The DM output is transferred to a DM memory for storage.

Programming the four separate functions in the processors greatly simplifies the applications for systems use. This allows the team members to have well defined tasks. The interfaces between team members are the processor interfaces and this can be accomplished through existing POSIX modules or memory storage cells (Write/Read being an ideal interface). The application programmer for that function would receive a given input and needs only to provide the prescribed output.

The process can be carried out using a Concerted Operating System (COS) for each function. The COS tends to be generic for each separate function. The interfaces between the separate processors are preferably high speed parallel busses and the Congruent memory. The data interfaces between the processors are preferably at the ISO 5 Level which is the domain of POSIX. POSIX modules will preferably be a part of the COS Software modules. Levels 6 and 7 will not be required, since there is no interim buffering. Since interrupts and Context Switching are not required, the functions of the COS are much simpler and much less time consuming when compared to its equivalent portion of a "Real-Time" Kernel or Operating system. The structure of the COS's lend themselves to being replicated to other processes of the same functionality.

It is preferred in the invention to store data in the DS memory and to maintain the DM memory in a Relational Data Base format. This would eliminate all of the bookkeeping required for transfers between Applications File and a Relational Data Base File. This will also allow a direct access to be made in response to a Structured Query Language query instead of a lengthy file search (this is based on an assumption that you are looking for something specific— not panning for gold). DEC has adopted a Load-locked/ store-conditional sequence and eliminated strict read-write ordering between processors. This allows one processor to write to its memory location and allows other processors to read the data file. This was a premise that was used to specify a congruent memory instead of a common memory. This can be further enforced by link lists. All processors will be able to use a large memory without fear of conflict and data will no longer be transferred from one processor to another.

BRIEF DESCRIPTION OF THE DRAWINGS

The schematic drawings illustrate certain features of the present invention.

| Figure Number | Description |
|---|---|
| 1 | C3M2 System Domain - Shows representative External Interfaces for the C3M2 System. |
| 2 | C3M2 Systems Conceptual Drawing - |
| 3 | C3M2 System Block Diagram - First block diagram showing COTS hardware Components |
| 4 | C3M2 Replicated System Expansion, Serial-Parallel-Or Both - Block diagram to show method of expanding systems for tiered or cascade configurations. |
| 5 | UNIX-COS Shell and Interface - Shows separate stand-alone configurations, UNIX for development and COS for Operations, no preemption. |
| 6 | Operational Sequence of Developing COS's - Shows how the UNIX Operating system will provide the development environment using COTS Software, UNIX Compiler, Ada Compiler, POSIX Software, and Inventions Software. |
| 7 | C3M2 Rapid Prototyping Evolution - Methodology for defining inputs, outputs, user interfaces, and displays before allocation of Software and hardware functions. |
| 8 | Closed Loop C3M2 System Design Methodology- Method for defining the class of engineers to accomplish the design tasks - Systems, hardware and Software. |
| 9 | Object Link List for Input Data - Method for tracking input data and their storage records. |
| 10 | C3M2 Function Operations Sequence (FOS), Shows the data trail through the C3M2 System. |
| 11 | Interleaving Classes of Objects by Priority - Method of interleaving data classes and types by priority and schedule to mitigate the use of Interrupts and Context Switching. |
| 12 | C3M2 software Context Diagram - Components of the C3M2 system effecting Software Processes. |
| 13 | C3M2 software System Processes - The Software system processes of the C3M2 System and their interfaces with the different databases. |
| 14A | C3M2 Control Flow Diagram for IO (Input). |
| 14B | C3M2 Control Flow Diagram for IO- (Query) |
| 15 | C3M2 Control Flow Diagram for DP. |
| 16A | C3M2 Control Flow Diagram for DM (User Data) |
| 16B | C3M2 Control Flow Diagram DM (Query) |
| 17 | C3M2 Control Flow Diagram DS |
| 18 | Sources, Data Sets, and Memory Allocation. |
| 19 | Comparisons of MPP, Symmetric & C3M2 Processing Methods |
| 20 | System Module Interface Drawing |

DETAILED DESCRIPTION OF THE INVENTION

Terminology

Figure 1:
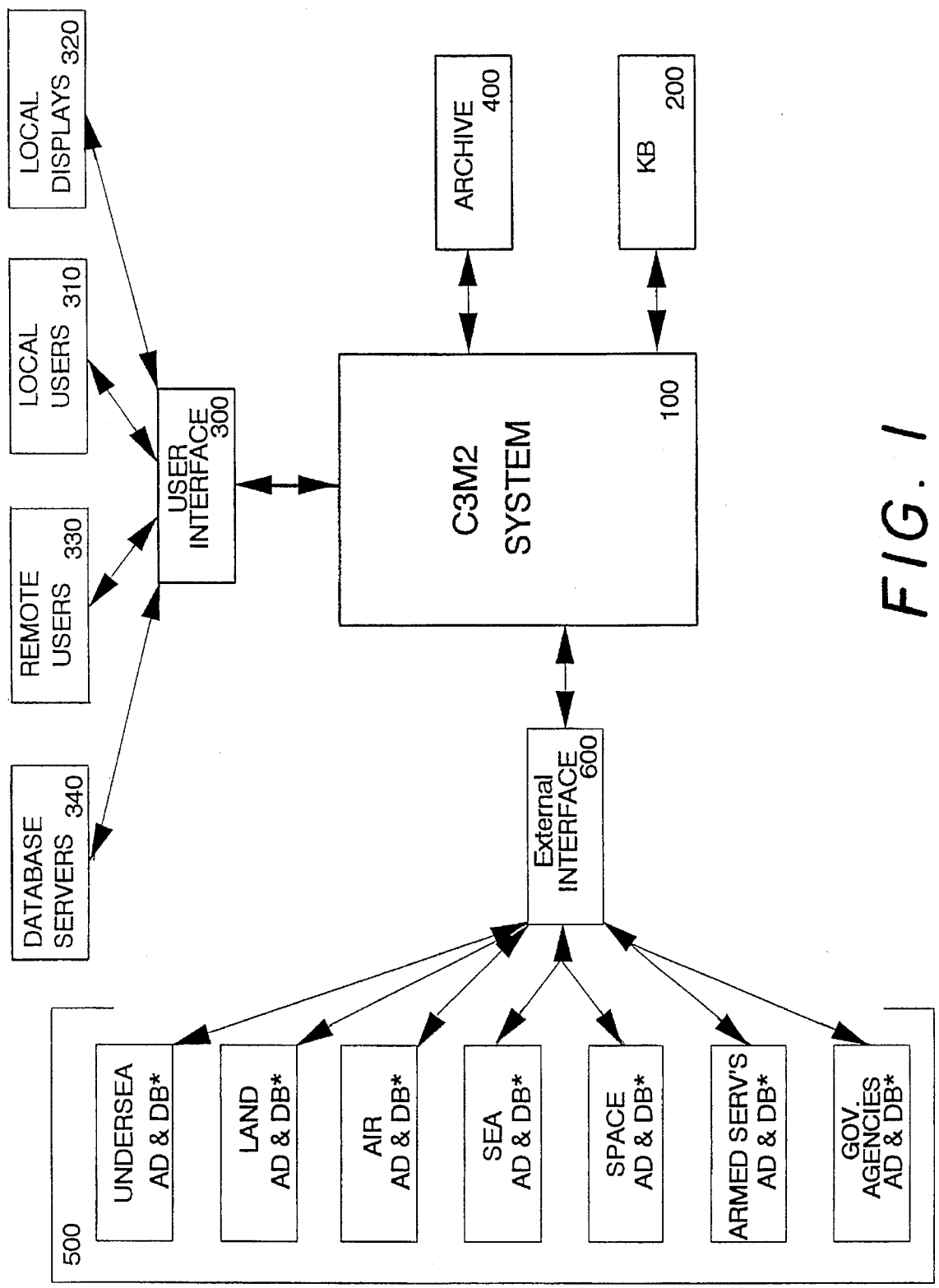

Terms used in this disclosure include
Methodology
  The system of principles, practices and procedures as applied to the field of computer engineering.
Standards
  Named identities under specified conditions that defines conditions for information processing and inter-operability.
Interfaces
  The interconnect of two or more hardware components or items for the transfer of data from one entity to another in data processing.
Complementary
  Two or more Processors operating in a complementary mode (the whole equals the sum of the parts) and have improved performance when compared to results of those produced by individual separate processors, i.e. 1+1 in concert >1+1=2.

Cooperative

Joint processing activity where one process does not wait on another process to begin operations.

Concurrent

Two or more processes operating in conjunction with separate instruction control units.

Multi-Processing

Two or more processors operating in concert (perform together in harmony) with cooperative and concurrent operations.

Multi-Tasking

Two or more processes operating in concert with cooperative and concurrent operations.

Congruent Operating Systems (COS)

Operating systems for each of the Complementary Processors (CP). Each COS provides the Input and Output of the CP, calls the Application Programs (AP) for each process, processes the priorities and schedules of each process, can be replicated for use in similar processes, and reduces the processing time to its absolute minimum.

Operating Systems

Operating system for the CPU. Controls all operations of the CPU, Memory Management, IO Drivers, Disk Drivers, AP, Priority, and schedule in a sequential fashion.

Memory Management

Memory allocations made during the planning phase for all memory users. Memory segments are divided into $1/1024$ segments of dedicated total active memory. The data archive memory occupies the majority of the memory and is in a Relational Database Format. The other memory segments provide the required memory storage elements of the Complementary processing's, systems Software and utilities. Each Processors writes to its memory, Load/Locked. Other processors Read or Exchange. The memory also serves as an interface between the Processors. The memory is identified as the Congruent Memory (CM).

Disk Management

The Archive Disk Storage is a mirror image of the Congruent memory. The Congruent memory transfers data to the Archive disk on a cyclic basis that is determined during the planning phase. Latency time is in the tens of milliseconds.

Long Term Archive

Archive Media which augments the Archive Disk. Latency time of the archive media is in the hundreds of milliseconds.

Knowledgebase

A database that contains information about prior experienced encounters in a particular field and the data and procedures resulting from that encounter, and the identity and/or solution.

User Interface

Dedicated interface for all Internal and external users. This include group displays and/or User/Servers or Client/Servers. The User interface is an interface to one of the Complementary processor's and receives data in real-time.

Class

In object-oriented programming, a group of objects that share a common definition, common properties, operations and behavior.

Entity

An object, event or process that is of interest in the context under consideration, and about which data may be stored in a data base.

Object

In Structured query language, anything that can be created, accessed or manipulated with Structured query language statements, such as databases, tables, records, views or indexes.

Type

A class of objects. All, objects of a specific type can be accessed through one or more of the same interfaces.

Concerted Operating Systems (COS)

A Trademark Term for Replicated Operating Systems by functions. The COS are complementary and do not require Interrupts or Context Switching.

Congruent Memory

A Trademark Term for the separate dedicated memories that perform the C3M2 storage functions. One process writes and other processes read (No Lock or Unlock). All storage elements are multiples or submultiples of other allocated memories and overlay its allocated storage cells.

DESCRIPTION OF THE PREFERRED EMBODIMENTS

Figure 20:
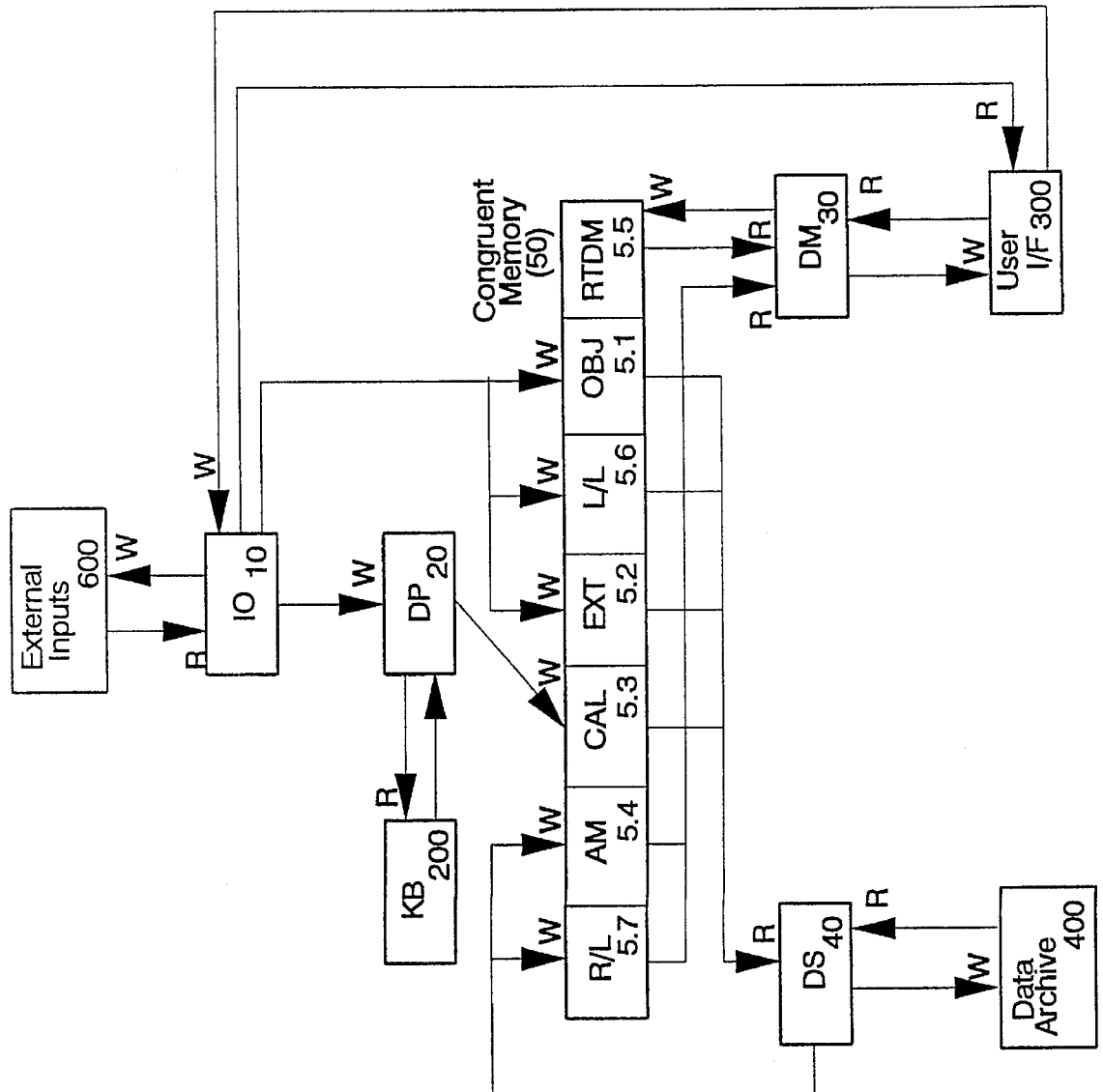

In the embodiment of the invention shown in FIG. 20, a computer system comprises four processors, four memories, and a set of instructions for each processor. An IO processor 10 receives data inputs and processes the data inputs to provide data outputs. A DP 20 processor performs a data processing function. A DM processor 30 performs a data distribution function. A DS processor 40 performs a data storage function. At least one memory means is provided for storing data from the IO processor. A dedicated DP memory 5.3 is provided for storing data from the DP processor. A dedicated DM memory 5.5 is provided for storing data from the DM processor. A dedicated DS memory 5.4, 5.7 is provided for storing data from the DS processor. IO instructions and means for causing the IO processor to transfer data outputs to the at least one memory means for storage are provided in the IO processor 10. DP instructions and means for causing the DP processor to retrieve data from the at least one memory, process said data to form calculated data; and transfer the calculated data to the DP memory for storage are provided in the DP processor 20. DM instructions and means for causing the DM processor to retrieve data from the DS memory and to transfer the data retrieved to the DM memory for storage are provided in the DM processor 30. DS instructions and means for causing the DS processor to retrieve data from at three of the memory means for storing data from the IO processor and the DP memory and to transfer the retrieved data to the DS memory for storage are provided in the DS processor 40.

It is preferred that the at least one memory means for storing data from the IO processor 20 comprises a DP cache memory operably associated with the DP processor 20. Usually, the cache memory will be integral with the DP processor. The memory means further comprises a dedicated IO memory 5.1, 5.2, 5.6 for storing data from the IO processor 10. The computer system preferably further comprises IO instructions in the IO processor 10 and means for causing the IO processor to transfer data outputs to the DP cache memory and to the dedicated IO memory. The DP instructions in the DP processor 20 and means for causing the DP processor to retrieve data from a memory preferably causes the DP processor to retrieve data from the DP cache memory. The DS instructions in the DS processor 40 and means for causing the DS processor to retrieve data from three of the memory means for storing data from the IO processor causes the DS processor to retrieve data from the dedicated IO memory.

Preferably, each data output from the IO processor is associated with a unique multicharacteristic identifier. The dedicated IO memory includes a first memory portion 5.1 for storing dynamic data; a second memory portion 5.2 for storing static data; and a third memory portion 5.6 for storing the multicharacteristic identifiers for the dynamic data and the static data. The DS memory preferably includes a first memory portion 5.4 for storing dynamic data, static data and calculated data grouped by a characteristic of the identifier associated with such data and a second memory portion 5.7 for storing the identifiers for the dynamic data, the static data and the calculated data. The DS instructions further preferably cause the DS processor to reformat the retrieved data based on identifier characteristic and to transmit the reformatted data for storage in the DS memory. The multicharacteristic identifier includes an object number and a receipt time for each data input. The DM instructions preferably further cause the DM processor 30 to reformat the retrieved data for the production of user notices, and to transfer the reformatted data to the DM memory 5.5 for storage.

In a further preferred embodiment of the invention, the computer systems is provided with a knowledgebase 200. The knowledgebase is formed from KB processor and means for the KB processor to receive calculated data having a common identifier characteristic from the DP processor 20. The Knowledgebase can perform a prediction function based on data trends for the data having the common identifier characteristic and produce a deviation signal when the calculated data from the DP processor is outside of predetermined limits from the value predicted by the KB processor. A KB memory can be provided for storing response information appropriate for each of a plurality of deviation signals. Instructions and means for causing the KB processor to retrieve the appropriate response information from the KB memory in response to the deviation signal and to transfer such response information to the DP processor are provided in the KB processor In a further preferred embodiment of the invention, there is provided an archive memory 400 for storing data for archive from the DS processor 40. Instructions and means are provided with the DS processor 40 for causing the DS processor to retrieve data for archive from the first memory portion 5.4 of the DS memory and the second memory portion 5.7 of the DS memory and to transfer such data to the archive memory 400 for storage.

A user interface 300 is preferably operably associated with the DM processor 30. The DM instructions preferably include a routine for determining whether a user notification should be transmitted to the user interface 300, a routine for generating the user notification, and a routine for transmitting the user notification from the DM processor 30 to the user interface 300. To speed up the transmission of new information and notices to the user interface, a DM cache memory can be employed. Generally the DM cache memory will be operably associated with the DM processor 30. The DM instructions include a routine to retrieve data from the DS memory and to transfer the data retrieved to the DM cache memory for storage, a routine to cause a flag to be placed with the data last retrieved from the DS memory; a routine to transmit the data stored with the flag to the user interface 300, a routine for determining whether a user notification should be transmitted to the user interface, a routine for generating the user notification, and a routine for transmitting the user notification from the DM processor to the user interface.

An external user interface 600 is preferably operably associated with the IO processor 10. Where the external user interface is present, the IO instructions preferably include a routine for processing queries from the external user interface, a routine for transmitting the processed queries from the external user interface to the DM processor 30, a routine for processing query responses received from the DM processor, and a routine for transmitting the processed query responses to the external user interface 600. The DM instructions preferably include a routine for processing queries received from the IO processor 10, a routine for retrieving data responsive to said query from the DM memory 5.5, a routine for generating a query response based on the retrieved data, and a routine for transmitting the query response to the IO processor 10. Queries can also be preferably processed by the DM processor 30. The user interface 300 is present. The DM instructions include a routine for processing queries from the user interface 300, a routine for retrieving data responsive to said query from the DM memory 5.5; a routine for generating a query response based on the retrieved data; and a routine for transmitting the query response to the user interface 300.

Interleaving incoming data for processing is an important feature of certain embodiments of the invention. For interleaving, there is provided in the IO instructions a routine for assigning a processing priority designator to data inputs, and a routine for scheduling the data inputs for ordered transmission to the DP processor 20 in a priority scheduler having a cyclic unvarying predetermined priority designator sequence. To keep data processing in Real Time, the computer system can be characterized as having a clock cycle speed and the sequence for the scheduler is selected based on said clock cycle speed so that the computer system has completed retrieval, processing and transmission to the DM memory of a first data sample having a common identifier characteristic prior to receipt by the IO processor of a second data sample having such common identifier characteristic.

For fast processing, it is desirable that new data be flagged for processing when it is placed in memory. The IO instructions and means for causing the IO processor 10 to transfer data to the IO memory 5.1, 5.2, and 5.6 for storage further comprises a routine for causing a flag to be placed with the transferred data. The DP instructions and means for causing the DP processor 20 to retrieve data from a memory and to transfer calculated data to the DP memory 5.3 for storage further comprises a routine for removing the flag from the retrieved data and a routine for placing a flag with the transferred data. The DM instructions and means for causing the DM processor 30 to retrieve data from the DS memory 5.4, 5.7 and to transfer the retrieved data to the DM memory 5.5 further comprises a routine for removing the flag from the retrieved data and a routine for placing a flag with the transferred data. The DS instructions and means for causing the DS processor 40 to retrieve data from the IO memory 5.1, 5.2, 5.6 and the DP memory 5.3 and to transfer the retrieved data to the DS memory 5.4, 5.7 for storage further comprises a routine for removing the flag from the retrieved data and a routine for placing a flag with the transferred data.

The DP instructions and means for causing the DP processor 20 to retrieve data from the DP cache memory, process the data to form calculated data and to transfer the calculated data to the DP memory 5.3 for storage preferably further comprises a routine for transferring the calculated data to the DP cache memory for storage. The DP instructions preferably further comprise a routine for establishing a relationship between a most recently formed calculated data and a previously formed calculated data in the DP cache memory, generating a data value representative of such relationship, and transferring such value to the DP memory 5.3 for storage. For many applications, it is desirable to calculate information such as the rate of change of the information relating to an object. For example, for aircraft, location can be calculated from a single set of data inputs. Velocity and direction require two sets of data inputs. Acceleration calculations require three sets of data inputs. To perform these calculations, the DP processor must access old information. If the aircraft is not accelerating, there is no need to perform acceleration calculations. To perform this functionality, the required information is preferably retained in the DP cache memory. The DP instructions include a routine for calculating a value for a predetermined relationship between data most recently retrieved from the DP cache memory and data previously retrieved from the DP cache memory, a routine for transferring the value to the DP cache memory for storage, a routine for calculating a calculated value trend from the stored values, a routine for predicting a predicted value for the next retrieved data based on the trend from the stored values, a routine for comparing the calculated value with the predicted value and completing further processing of the calculated value when the calculated value is outside of predetermined limits from the predicted value, and a routine for transferring the calculated value from the DP cache memory to the DP memory for storage.

Incoming data to be processed will generally arrive with a data header containing information relating to data source, class, data format, and associated data parameters. The data will generally relate to dynamic information, such as object position, or static information, such as object identity or information from an external database. External interface 600 will be the source of the data. Preferably, an IO cache memory is operably associated with the IO processor. The data source is operably associated with the IO cache memory. The data source transmits object data and external I/F data to the IO cache memory for storage. The IO instructions include a routine to retrieve object data from the IO cache memory, a routine to retrieve external I/F data from the IO cache memory, a routine for identifying the source, class and type of data formats and associated data parameters and a routine to transfer the object data to the IO memory 5.1, 5.2, 5.6 for storage. For tracking purposes, the IO instructions generally further include a routine for causing the IO processor to assign a multicharacteristic identifier to each data input and a routine for causing the IO processor to transmit the multicharacteristic identifier to the third memory portion 5.6 of the IO memory.

In a preferred embodiment of the invention, queries can be processed from external users through the IO processor 10. Preferably, an IO cache memory is operably associated with the IO processor 10. A DM cache memory is operably associated with the DM processor 30. An external user interface 600 is operably associated with the IO processor 10. External user interface instructions and means for causing the external user interface to transmit queries to the IO cache memory for storage are also provided. A dedicated external user interface memory is operably associated with the external user interface 600, usually internally. The IO instructions include a routine to retrieve queries from the IO cache memory, a routine to format the queries in an appropriate protocol, a routine to identify and transmit the queries to the DM cache memory for storage, a routine to retrieve query responses from the DM cache memory, a routine to format the query responses from the DM cache memory into the protocol, and a routine to transmit the queries and the query responses to the external user interface memory for storage.

One of the features of a preferred embodiment of the invention is the storage of data in a relational database for fast retrieval and response. This functionality is provided by the DS processor 40. A DS cache memory is preferably operably associated with the DS processor. An archive memory 5.4 is provided for storing data for archive from the DS processor. The DS instructions and means for causing the DS processor to retrieve data from IO memory 5.1, 5.2, 5.6 causes the DS processor to retrieve such data into the DS cache memory. The DS instructions further include a routine to retrieve dynamic data from the DS cache memory, a routine to retrieve static data from the DS cache memory, a routine to retrieve calculated data from the DS cache memory, and a routine to retrieve the identifiers for the dynamic data, the static data, and the calculated data from the DS cache memory. The identifiers are converted to record numbers by a routine in the DS instructions. The DS instructions further include a routine to convert the dynamic data, the static data, the calculated data and the record numbers to a relational data base format for storage as a relational data base in the DS memory and a routine for storing the relational data base in the DS memory. To provide long term storage and accessibility of information in the long term storage, the DS instructions further include a routine for retrieving the relational data base from the DS memory, a routine for storing the thus retrieved relational data base in the archive memory, a routine for transferring the relational data base from the archive memory to an archive media for storage, and a routine for transferring a relational data base from an archive media to the archive memory.

One of the features of a preferred embodiment of the invention is to provide a pathway for internal users to access external databases. To carry this out, a DM cache memory operably is preferably associated with the DM processor 30. The user interface 300 is also operably associated with the DM processor. At least one external database operably associated with the DM processor. The DM instructions include a routine for processing queries received from the user interface, a routine for identifying the external database containing data responsive to said query, a routine for retrieving the data responsive to said query from the external database, a routine for generating a query response based on the retrieved data, and a routine for transmitting the query response to the user interface 300.

To practice the process of a preferred embodiment of the invention a data input is received in an IO processor 10. The data input is processed in the IO processor and an IO output is produced. The IO output is transferred to an IO memory 5.1, 5.2, 5.6 for storage. The IO output is preferably also transferred to a DP cache memory for storage, for faster pickup by the DP processor 20. The cache memory will generally be a part of the DP processor. The IO memory output is retrieved from the IO memory 5.1, 5.2, 5.6. The retrieved IO memory output is received in a DS processor 40. The received IO memory output is processed in the DS processor and a DS output is produced. The DS output is transferred to a DS memory 5.4, 5.7 for storage. A DP cache memory output is retrieved from the DP cache memory. The DP cache memory output is received in a DP processor 20. The received DP cache memory output is processed in the DP processor and a DP output is produced. The DP output is transferred to the DP cache memory. The DP output is transferred to a DP memory 5.3 for storage. A DP memory output is retrieved from the DP memory 5.3. The retrieved DP memory output is received in a DS processor 40. The received DP memory output is processed in the DS processor and a DS output is produced. The DS output is transferred to the DS memory 5.4, 5.7 for storage. The DS memory output is retrieved from the DS memory 5.4, 5.7. The retrieved DS memory output is received in a DM processor 30. The received DS memory output is processed in the DM processor and an DM output is produced. The DM output is transferred to a DM memory 5.5 for storage.

To carry out interleaving, a processing priority designator is assigned to data inputs to the IO processor 10. The data outputs from the IO processor 10 are scheduled for ordered transmission to the DP processor 20 in a priority scheduler having a cyclic unvarying predetermined priority designator sequence.

To carry out the flagging feature of the invention, a flag is placed with all data when it is transferred to a memory.

The data processing function is carried out by calculating a value for a predetermined relationship between data most recently retrieved from the DP cache memory and data previously retrieved from the DP cache memory. The value is transferred to the DP cache memory for storage. A calculated value trend is calculated from the stored values. A predicted value for the next retrieved data from the DP cache memory based on the trend from the stored values. The calculated value is compared with the predicted value. Further processing of the calculated value is performed when the calculated value is outside of predetermined limits from the predicted value. The calculated value is transferred from the DP cache memory to the DP memory for storage.

For processing a query from a user interface, a DM memory output is retrieved responsive to the query from the DM memory. A query response is generated based on the retrieved DM memory output in the DM processor. The query response is transmitted to the user interface. User notices may also be generated for the user interface. The DM processor determines whether a user notification should be transmitted to a user interface. If so, the user notification is generated by the DM processor and transmitted from the DM processor to the user interface.

For tracking, a unique multicharacteristic identifier is assigned to each data input to the IO processor. This multicharacteristic identifier is transferred as IO output to the IO memory for storage and the DP cache memory for storage.

To prepare for setting up the relational database, the IO processor identifies the dynamic data and the static data and transfers the dynamic data as IO output to a first portion of the IO memory for storage and the static data as IO output to a second portion of the IO memory for storage. The multicharacteristic identifiers are transferred as IO output to a third portion of the IO memory for storage. The DS processor completes setting up the relational database. An IO memory output is retrieved from the first portion of the IO memory, the second portion of the IO memory, and the third portion of the IO memory. The retrieved IO memory outputs are received in the DS processor. The received IO memory outputs are reformatted in the DS processor which produces a reformatted DS output. The reformatted DS output is transferred to the DS memory for storage.

Description of the Best Mode

The system concept of the C3M2 System is to have the capability of providing a Processor for each major processing step of automated data processing, i.e. if you have four steps then you need a minimum of tour but it could be 8 or 12 or 16 processors. The system shall be Multi-tasking for each step. Source headers, link lists and entity or object identifiers are the methods that shall be used for identity of the different classes, types and objects for the variety of data in the system. The source and data type are contained in the source header. The class and type identity are contained in the object identifiers. The multi-tasking would be by schedule (interleaved by priority). This was selected instead of cycle sharing for improved concurrency.

The multi-tasking by application processing steps requires much less time than the normal Serial Operating system Processing time. Each of the Processors shall operate independently of the other Processors and shall operate Concurrently. The data processes shall run until task completion prior to beginning the next process, Cooperative Processing. Each Processor shall operate independently, using it's own COS. The COS's have generic modules and can be configured for multiple processes. Each COS will operate independently and shall interface directly with the Operating system of the Processor, but without preemption. The clock cycle time for baseline operations is 4 × the Processor Clock Cycle or 4×200 MHZ=800 MHZ. The instructions that can be processed per second is 1.6 Giga-Flops for the four processor baseline system. The system speed is further enhanced by its lack of system overhead where interrupts, context switching and process initiation times are not required.

Data records for use by the system are Relational Database (RDB) formats for the entities, objects and attributes in a Flat File. The Flat File is defined as an array of data records. The files are by class of system elements. The RDB files to reside in the Congruent Memory (CM) for Real Time access and are stored in the Archive Media (AM) on a cyclic basis that is determined in the planning phase. The latency time for access of the AM will be in the millisecond range. The cyclic time for exchange of data from the CM to the AM would be in the Hours-Type time period. Data files for making up the data records for Objects are initial or position Data, Calculated Data for object performance & etc., Reference Data from the External Data base managers and Knowledgebase, Link List and Data Source data for each record. The entire record then becomes a part of the individual records for each object record number for the Real Time Archive data set.

The C3M2 system in its basic configuration has 4 separate Processes running on four separate Processors. The four processors share a direct access Congruent Memory (CM). The CM is partitioned to specific storage areas with one Processor writing and one or more Processors reading the same partitioned memory.

The first selection considered for Data Class Priorities was the use of a scheduler. The current system criteria does not allow the use of interrupts or context switching. This criteria eliminated the normally accepted method of decision making capability for the Scheduler. It soon become apparent that the requirement could be met by delaying the processor for one or more cycle times (through Interleaving) and insert the parameter in it proper data class and its own object or track number. Since all parameters were time stamped, the actual processing time in its own Type and Class is still accomplished in real-time. The major factor was to keep the processing time in Real Time (less than the time between two data samples). Other alternate methods were explored to ascertain if other methods were more efficient than a scheduler. A "Data Interleaver" method appeared to be much simpler than a scheduler, if you observed the required criteria, This method would eliminate an entire Scheduler Module. Since "Known data" is used to plan operations, the types and classes of data are all that is needed to formulate an interleaver scheme. The lowest Data Rate has the highest Priority. The highest data rates have the lowest priority (number of samples per second). The criteria for the interleaver design is:

1. The cycle time of the computer must be faster than the sampling rate of the total data samples (more cycle times than sample clocks per second).
2. The sample times per data class and type shall be in their order of priority.
3. Each data sample is sampled in its order of priority. If data samples are not available, the process falls through to the next lower priority (no loss of time or addition of overhead).
4. The system can accommodate any number of data classes and types if this criteria is followed.

Figure 11:
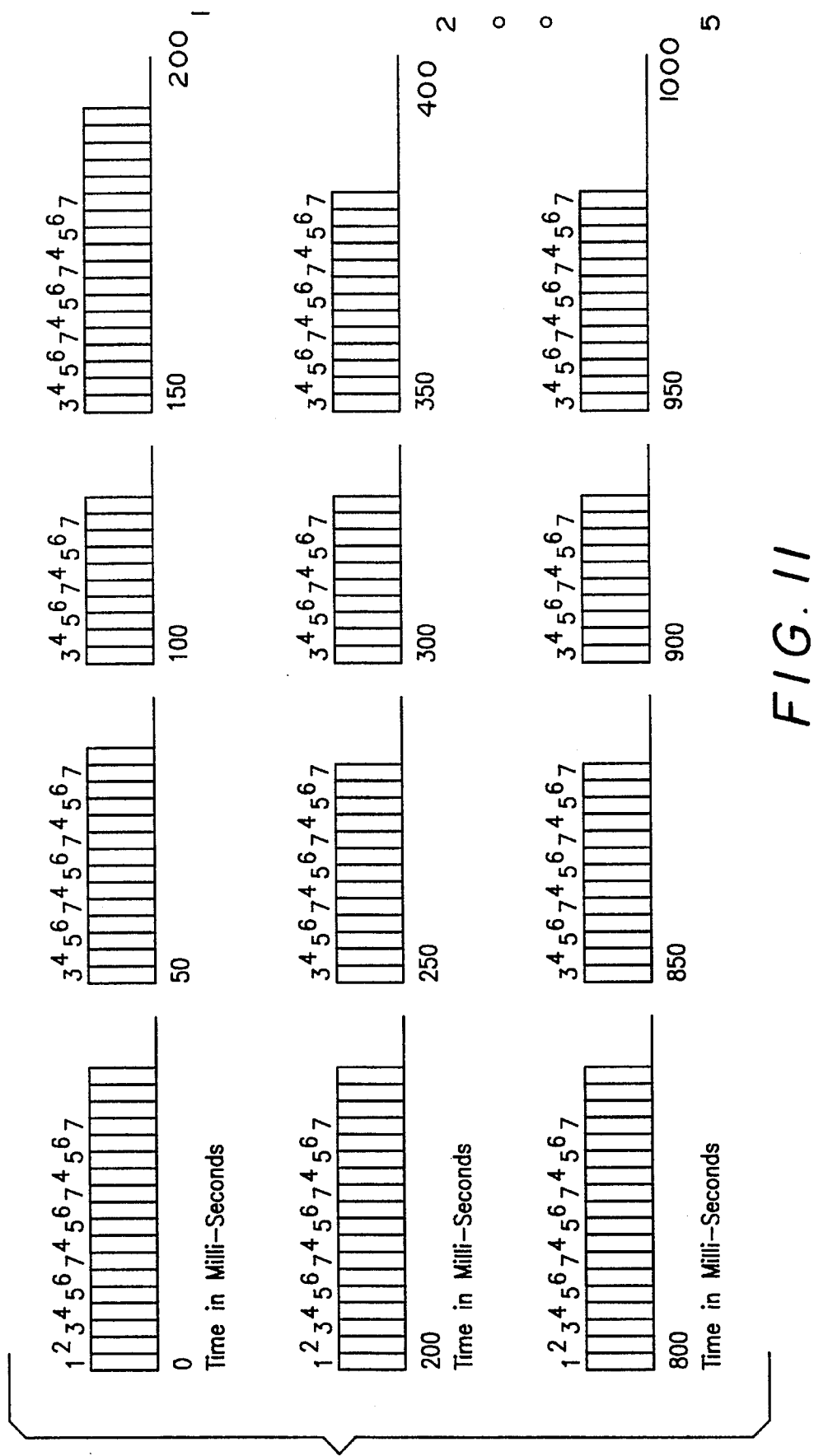

An example of the interleaving scheme is shown by FIG. 11, Inter-leaving Classes of Objects by Priority, for 7 classes of data. The system will allow almost any number of objects, types and classes that are known to the user. Any new data type can be entered when it is known to the user or identified by the system and is entered on the pointer or link list.

The interleaving of data for processing occurs at the IO. The priority are normally allocated in reverse order, i.e. the least sampled and the slowest sampled has the highest priority and the most frequently sampled with the most data has the lowest priority. The sampling priority falls through to the next lowest priority if data is not available. The data samples are listed in order of priority and by class. The classes are identified on FIG. 11. The time segments are shown arbitrarily in 200 millisecond segments. This is further reduced to subsegments of 50 milliseconds. The 50 millisecond subsegment is sampled in the order of priorities established in the planning phase. The first 50 millisecond subsegment has a sampling rate of 1 through 7 for the first 7 samples, then 4 through 7 for the remainder of the 50 millisecond subsegment. Each of the three remaining 50 millisecond subsegments begin with a Priority 3 sample and then reverts to the 4 through 7 priority for the remainder of the subsegment. There are 5 samples of Class 1 and 2 Priorities per second. There are 20 samples of Class 3 Priority per second. There will be approximately 2×10(6) priority samples per second for the IO or 1,999,970 samples remaining for Classes 4, 5, 6, and 7. Two hundred computer instructions per sample was used for timing purposes. The encapsulation of the IO is not effected by other operations of the system and the timing is solely a function of the IO Process.

Figure 12:
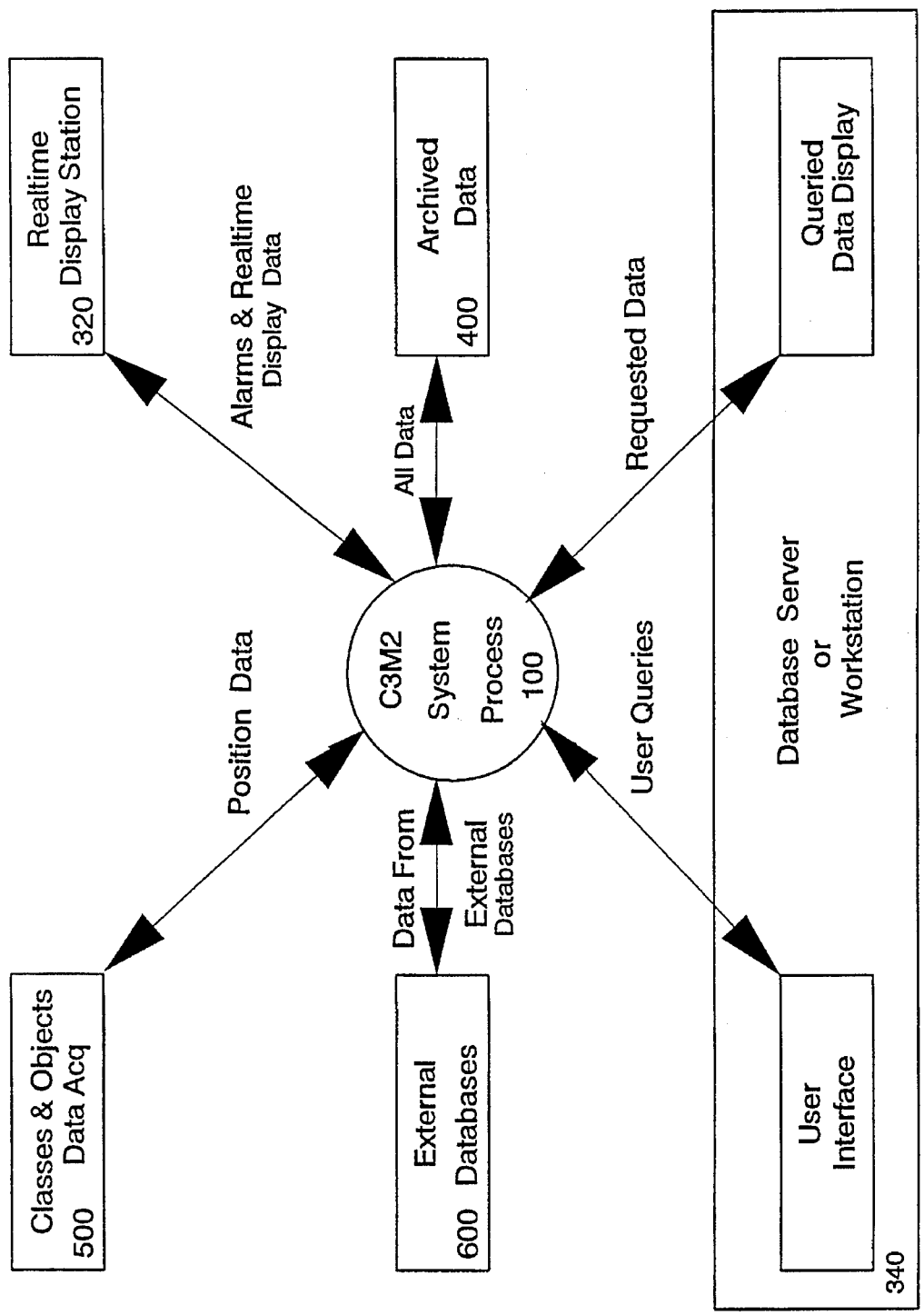

The System Connectivity is shown by FIG. 12, C3M2 Software Context Diagram. System Functions of the C3M2 System includes the Communication Links to External Sources of Data (600), Data Servers (300), User Work Stations (310), Real Time Displays (330), Data Archival Devices (400) and the C3M2 System (100). The system design envisions any number of communications interfaces for Fiber Optic Interfaces to External Users. The communications interfaces of the C3M2 system would be connected directly to Standard Communications Links, i.e. High Speed Data Transfer Links and Networks using standard formats and protocols. Data to be communicated to the C3M2 System includes Sensor and Acquisition Data (500) from Real Time Sources (Dynamic Data) and External Data (600) of interest to the Users, Remote data accesses and Distributed data base management system (Static or Reference Data). The data would be processed by the C3M2 System (100) and made available to the System Users (310), Displays (330) and Data Archive (400).

The data would also be available to all authorized External Users. The Users could perform at work stations interconnected directly to the Real Time distributed memory function of the C3M2 System or to a Data Server (300) connected to the Real Time DM Function. Display functions could be connected directly to the Real Time DM Function or to a Data Server.

Figure 13:
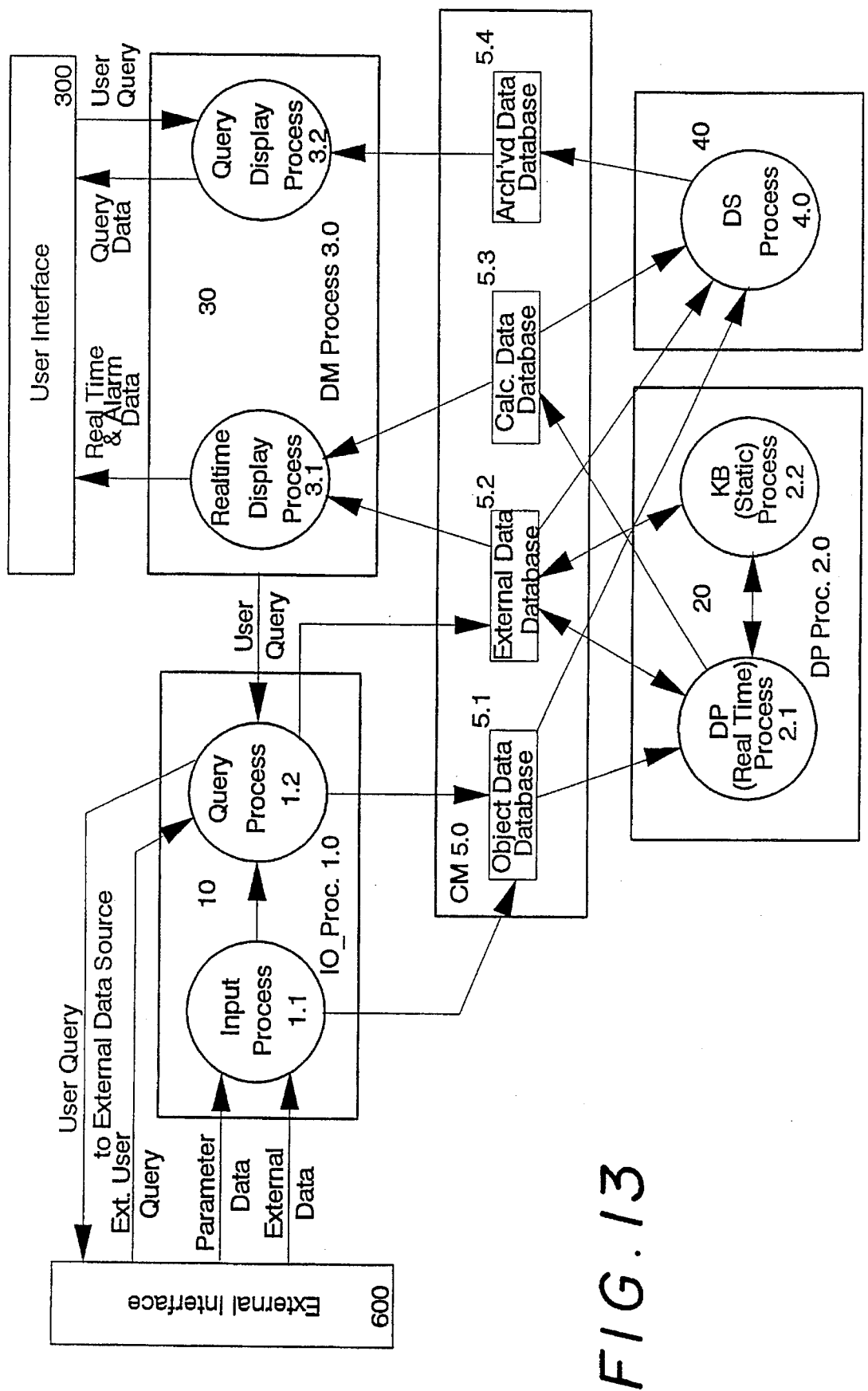

The block diagram of the C3M2 system processes is shown by FIG. 13, C3M2 Software System Processes. The system design envisions any number of bridges from the Fiber Optic Interfaces to External Users. Data to be communicated to the IO (1.0) include all position data and external data from databases and other external resources. The IO will transform any required external data to a standard protocol and format for use in the C3M2 System. The IO shall then store the data in the Position Database (5.1) of the Congruent Memory (5.0). The data shall be stored in the record or object format and the IO shall update its associated Link List. The DP (2.0) shall access the Congruent Memory when data is available. Data availability is conveyed by the Link List. External data shall be accessed by the IO (1.2) and it's data shall be stored in the External Data Database (5.2) and the IO shall update it's Link List. The DP (2.1) shall provide data to the Knowledgebase (2.2) for Objects and their attributes and receive identity or support data in return. The processed data will be stored in the Calculated Data Database (5.3) by the DP. The DP shall also update the Link List of the calculated Data Database. The DS (4.0) shall control all archive data in the Congruent Memory and Archive Data Database (5.4). The Data storage Process shall transfer data from the Position Data (5.1), Calculated Data (5.2), and External Data (5.3) to the Archive Database (5.4) on a cyclic basis. The archive data to be real-time, critical-time and historical data. The Real Time DM (3.0) shall provide the User interfaces to the C3M2 system, support all display systems (3.1), User Queries (3.2), User Work Stations and Database Servers.

Figure 14A:
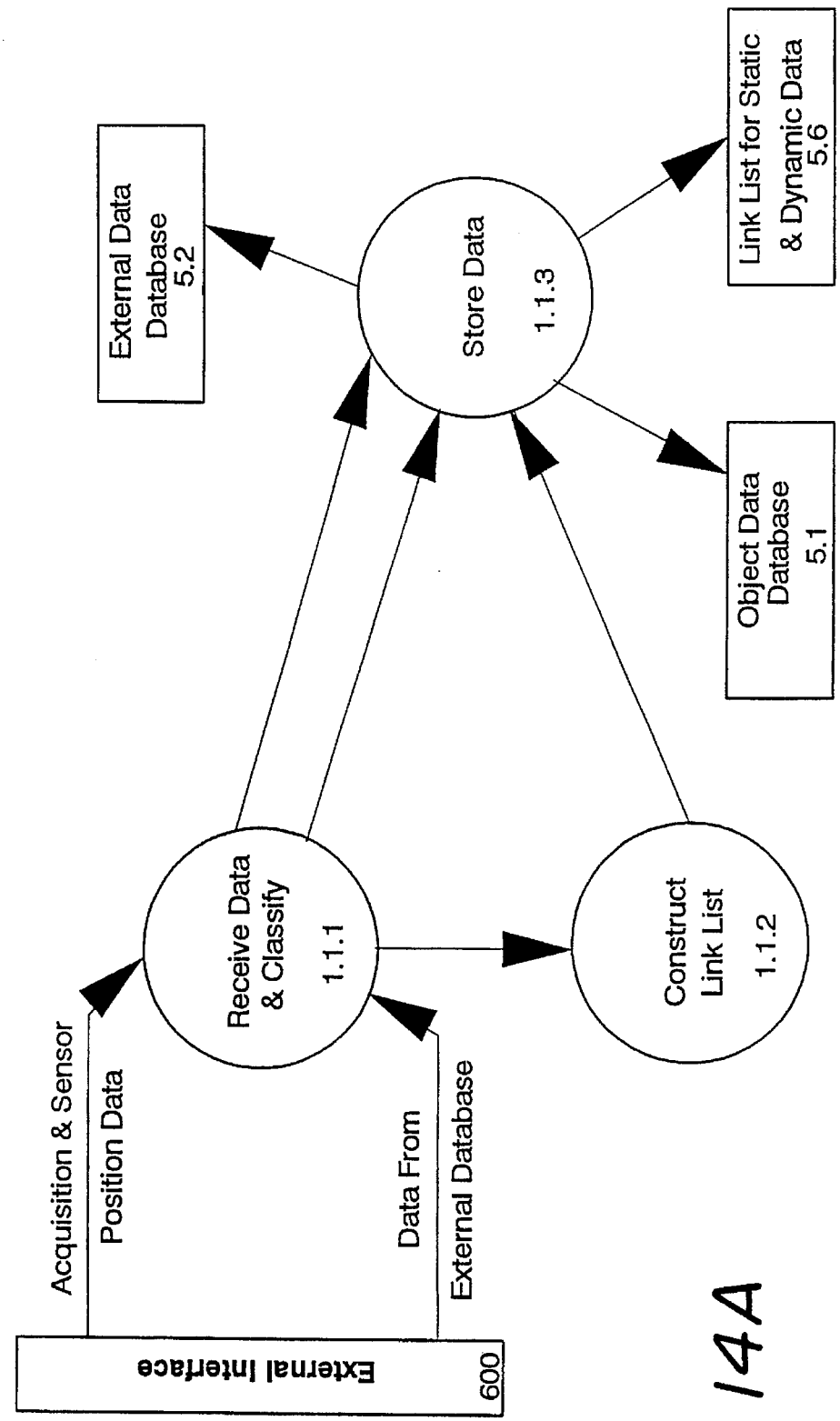
Figure 14B:
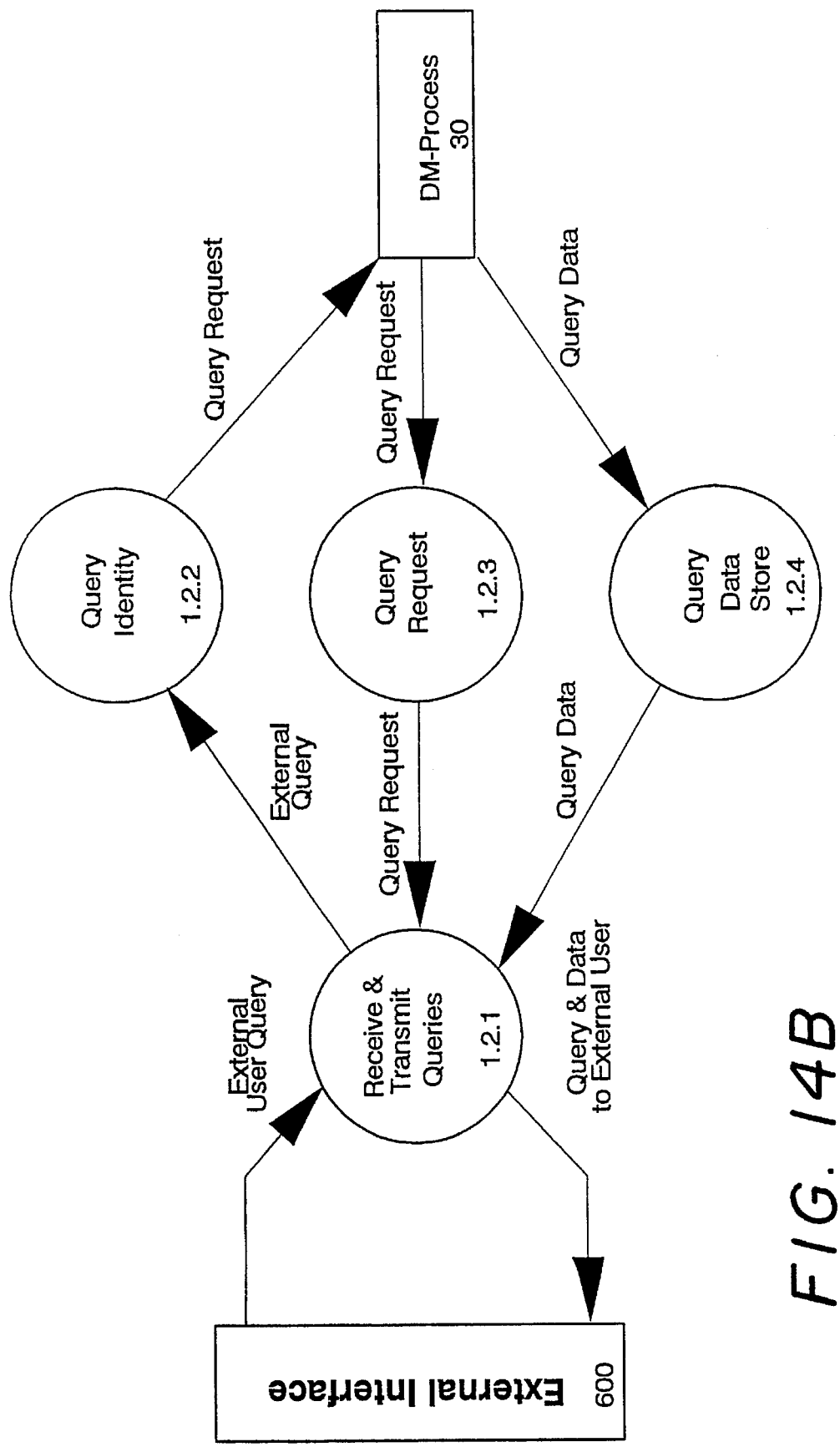

The IO (1.0) is the interface to all outside interfaces, Comm Lines and other Processing Nodes. Resident Data in the IO shall be the interfacing formats and control methodology for each external interface. Intrasystem interfaces for the IO include the Real Time DM and the Congruent Memory. Resident data for the intra-system interfaces include instructions for the Real Time DM and the dedicated memory locations (Record and Link List) for each record of each external interface. Link List and Look-Up Table locations for all dedicated intra-system interfaces are resident in the IO and the Congruent Memory. The Control Flow Diagram (CFD) is shown by FIGS. 14.1 (Input) and 14.2 (Query), C3M2 Control Flow Diagrams for the IO. Associated with the CFD is one or more Input Function/Process Output (IFPO) table listing Inputs, functions performed by the process and the processing required for each section of the CFD.

The IFPO for the IO Processes are shown by Table 4-1.1 (Input) and 4-1.2 (Query) IO (Input/output) Requirements.

TABLE 4-1.1

INPUT/OUTPUT (IO) Requirements (Input)
INPUT FUNCTION/PROCESS OUTPUT (IFPO)
(Baseline IO Requirements)

| Inputs | Functions | Outputs |
|---|---|---|
| A. Surface Craft - 50 Inputs, Samples every 20 Seconds, Range and Bearing, External Reference Data | 1. Receive samples (Range and Bearing) & Classify from Surface Craft. Speed < 50 Knots.<br>2. Receive data from external reference sources<br>3. Store sample and reference data in memory.<br>4. Construct a link list for records in memory | 1.3 Store Reference data as applicable, store sample data once/minute in common memory<br>1.4 Update Link List when Store completed. |
| B. Special Vehicles - 50 Inputs, Samples ever 4 seconds, Range, Elev. & Bearing 250 Knots Max. External Reference Data | 1. Receive samples (Range, Bearing & Elev.) & Classify from SP Vehicle. Speed < 250 Knots.<br>2. Receive data from external reference sources<br>3. Store sample and reference data in memeory<br>4. Construct a link list for records in memory | 1.3 Store Reference data an applicable, store sample data once/20 Seconds in common memory<br>1.4 Update Link List when Store completed. |
| C. Aircraft - 100 Inputs, samples every 0.5 seconds, Range, bearing, elev, & refractice index - if avail. External Reference Data | 1. Receive samples (Range, Bearing, Elev. & RI) & Classify from Aircraft. Speed > 250 Knots.<br>2. Receive data from external reference sources<br>3. Store sample and reference data in memeory<br>4. Construct a link list for records in memory | 1.3 Store Reference data as applicable, store sample data once/2 Seconds in common memory<br>1.4 Update Link List when Store completed. |
| D. Short Range Missiles 25-Inputs-Samples every 25 Second, Range, Bearing, Elevation, Refraction Index. 3000 Knots Mx | 1. Receive samples (Range, Bearing, Elev. & RI) & Classify from Short Range Missile. Speed > 2500 K<br>2. Receive data from external reference sources<br>3. Store sample and reference data in memeory<br>4. Construct a link list for records in memory | 1.3 Store Reference data as applicable, store sample data once/1 Seconds in common memory<br>1.4 Update Link List when Store completed. |
| E. Long Range Missiles 10-Inputs Samples every 0.1 Second, Range, Bearing, Elevation, Refraction Index, 6000 Knots Mx | 1. Receive samples (Range, Bearing, Elev. & RI) & Classify from LRM's. Speed > 6000 Knots.<br>2. Receive data from external reference sources<br>3. Store sample and reference data in memeory<br>4. Construct a link list for records in memory | 1.3 Store Reference data as applicable, store sample data once/0.5 Seconds in common memory<br>1.4 Update Link List when Store completed. |

Processing 1.1.1 Receive Data and Classify (1.1.1)
a. Retrieve the sampled dynamic data from the External Interface (600).
b. Identity each data sample from the communications header as to its Source, Class, Type and Object.
c. Provide Priority and schedule for each data sample during current time frame.
d. Retrieve static data from the External I/F (600).
e. Identifies the static data from the communications header for data source, database, query No., data records, date validated, and time stamp.
1.1.2 Construct a Link List (1.1.2)
a. Provide Dynamic data to the Object Link List (5.1), includes Record No., time stamp, and updated data Flag.
b. Provide data for the Static Data Link List and includes the Static Record No., Database name, Time stamp, Source, Class, Type, Object and update data Flag.
1.1.3 Store Data (1.1.3)
a. Provide outputs of Dynamic data to the IO dedicated Object memory and set the updated data Flag.
b Stores the Static data in the EXT dedicated memory (5.2) for external data from databases and external sources, set the data update Flag.
c. Stores Link List data in the L/L dedicated memory (5.6), set the data update Flag.

TABLE 4-1.2

Input/Output (IO) Requirements (Query)
INPUT FUNCTION/PROCESS OUTPUT (IFPO)
(Baseline IO Requirements)

| Inputs | Functions | Outputs |
|---|---|---|
| A. Surface Craft Queries to RDA's or DDMS Queries from RDA or DDMS Refer. data from/to DDMS's Queries from C3M2 Users | 1. Interfaces with External Interfaces (Safenet).<br>2. Provides interface compatability for all Queries.<br>3. Provided I/O data storage for Ref. & Query data.<br>4. Provides the IO_Process & DM_Process Interface. | 1. External User Query Request.<br>2. CRDB User Query to DDMS.<br>3. External Reference Data as queried by CRDB Users. |
| B. Special Vehicles Queries to RDA's or DDMS Queries from RDA or DDMS Refer. data from/to DDMS's Queries from C3M2 Users | 1. Interfaces with External Interfaces (Safenet).<br>2. Provides interface compatability for all Queries.<br>3. Provided I/O data storage for Ref. & Query data.<br>4. Provides the IO_Process & DM_Process Interface. | 1. External User Query Request.<br>2. CRDB User Query to DDMS.<br>3. External Reference Data as queried by CRDB Users. |
| C. Aircraft - 100 Inputs, samples Queries to RDA's or DDMS Queries from RDA or DDMS Refer. data from/to DDMS's Queries from C3M2 Users | 1. Interfaces with External Interfaces (Safenet).<br>2. Provides interface compatability for all Queries.<br>3. Provided I/O data storage for Ref. & Query data.<br>4. Provides the IO_Process & DM_Process Interface. | 1. External User Query Request.<br>2. CRDB User Query to DDMS.<br>3. External Reference Data as queried by CRDB Users. |
| D. Short Range Missiles Queries to RDA's or DDMS Queries from RDA or DDMS | 1. Interfaces with External Interfaces (Safenet).<br>2. Provides interface compatability for all Queries.<br>3. Provided I/O data storage for Ref. & Query data. | 1. External User Query Request.<br>2. CRDB User Query to DDMS.<br>3. External Reference Data as queried |

TABLE 4-1.2-continued

| | | | | | |
|---|---|---|---|---|---|
| | Refer. data from/to DDMS's Queries from C3M2 Users | 4. | Provides the IO_Process & DM_Process Interface. | | by CRDB Users. |
| E. | Long Range Missiles | 1. | Interfaces with External Interfaces (Safenet). | 1. | External User Query Request. |
| | Queries to RDA's or DDMS | 2. | Provides interface compatability for all Queries. | 2. | CRDB User Query to DDMS. |
| | Query from RDA or DDMS | 3. | Provided I/O data storage for Ref. & Query data. | 3. | External Reference Data as queried |
| | Refer. data from/to DDMS's | 4. | Provides the IO_Process & DM_Process Interface. | | by CRDB Users. |
| | Queries from C3M2 Users | | | | |

Processing 1.2.1 Receive and Transmits Queries (1.2.1)
a. Retrieves Query Inputs from the External I/F (external DDMS).
b. Transfers Query data to Query Identity (1.2.2).
c. Receives data from the Query Request (1.2.3), formats and transfers to the desired External User.
d. Received Query Data from Query Data Store (1.2.4), formats and transfer the data to the requesting External User.
1.2.2 Query Identity (1.2.2)
a. Provides identity of External Data Queries using the Message Headers for Source, Class, Types, Objects & Time Stamps.
b. Transfers the Query request tot the DM Process (3.0).
1.2.3 Query Request (1.2.3)
a. Receives Query Request from the DM_Process (3.0).
b. Provides the pqoperly formatted query (includes Communications Header) for transfer to the correct External User.
1.2.4 Query Data Store (1.2.4)
a. The IO_Process provides Interim storage for the Query data provided by the DM Process (30).
b. The IO_Process provides format and message heading information for the requested Query Data, as requested by External authorized Users.

Processing steps for the Control flow diagrams are shown in the processing section of the IFPO. The processing section of the IFPO will be expanded one or two layers during detail design. The processor shall schedule all inputs and outputs of the systems, provide a priority for each IO, and have the Address Pointers for it's outputs, to ensure that all requirements and transfers are met. All input data (1.1) shall be converted to binary data and all output data (1.3) shall be converted to the desired format from binary data. Any overload to be transferred to a Cooperative Processor.

Figure 15:
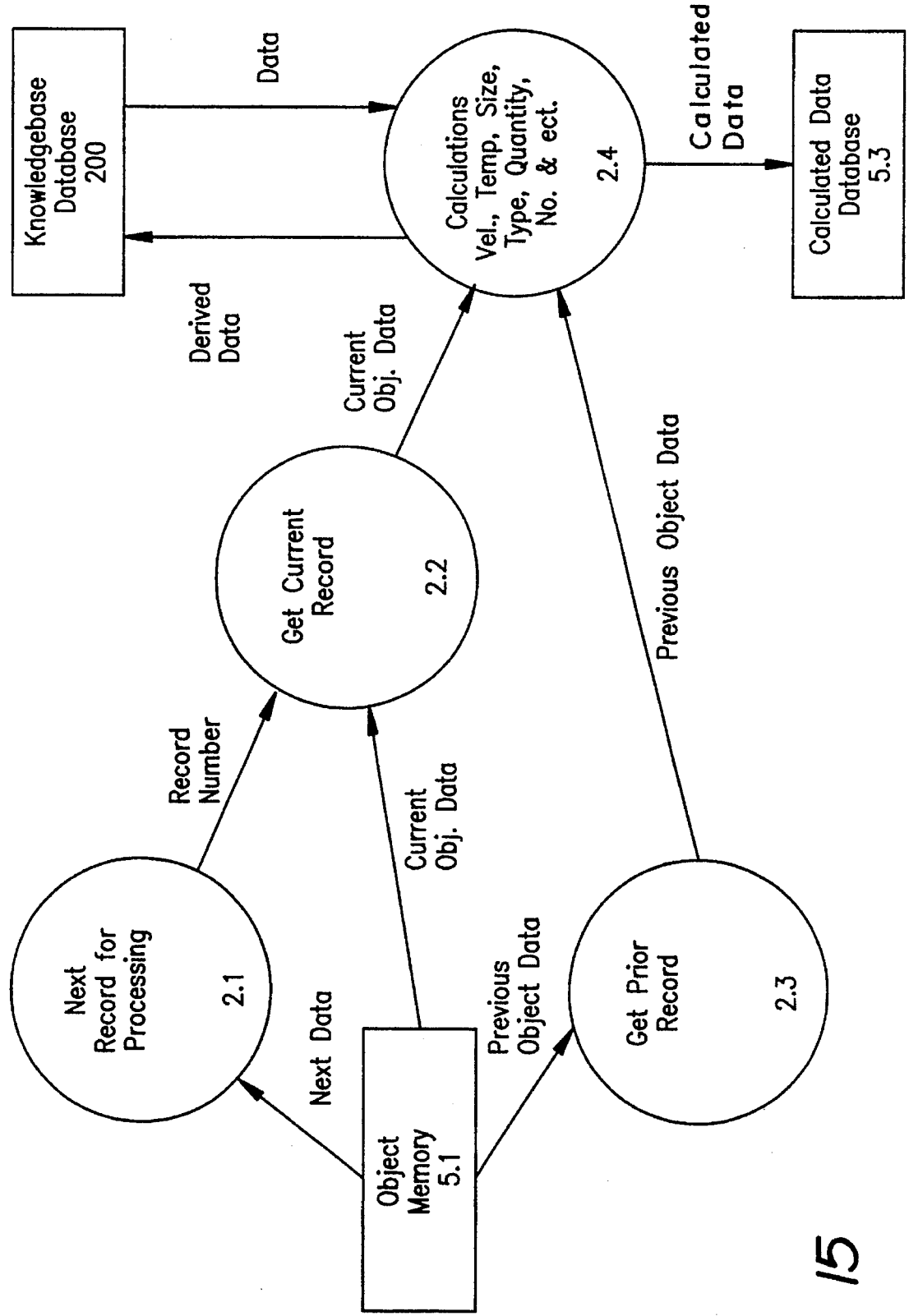
Figure 16A:
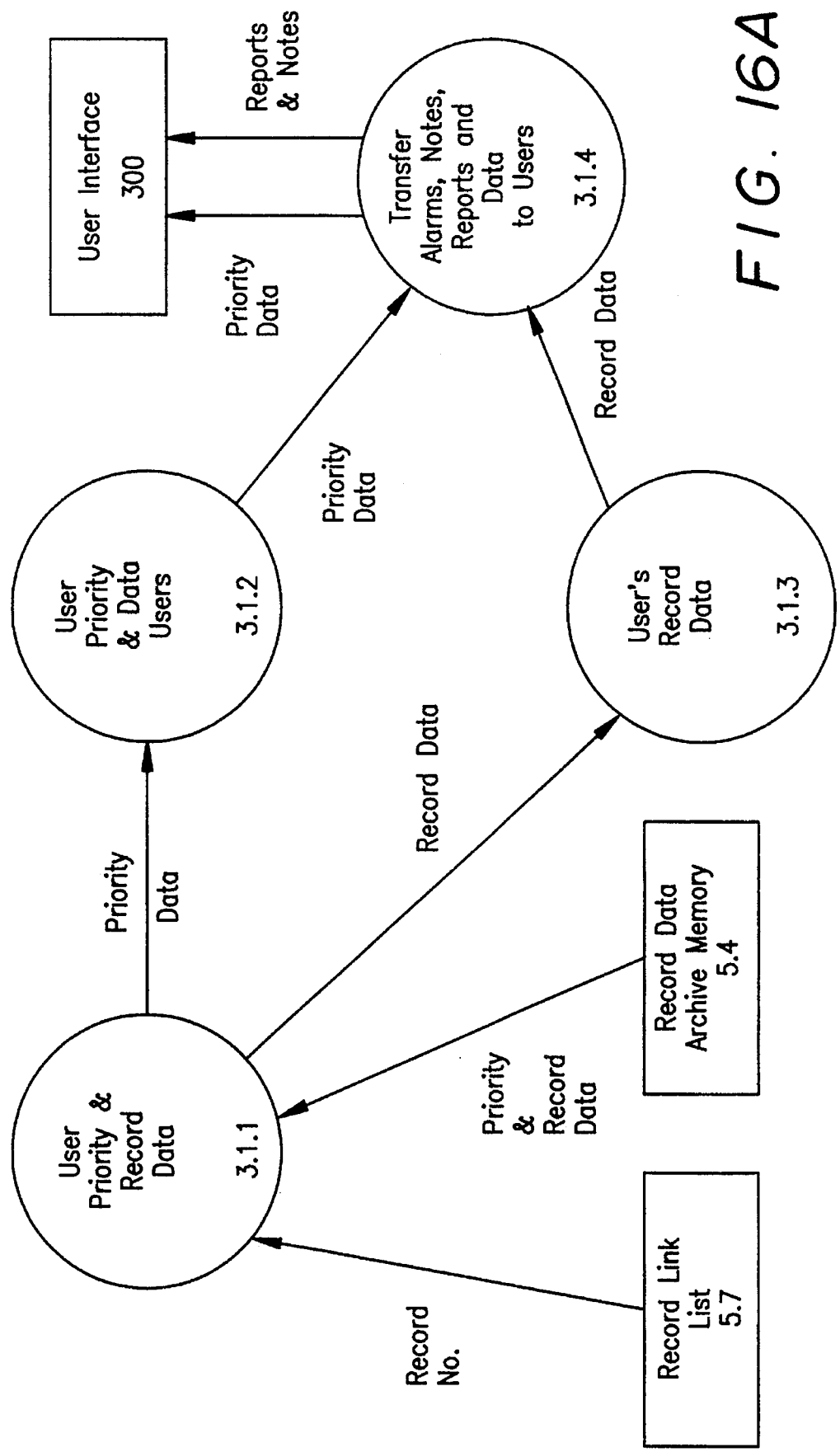
Figure 16B:
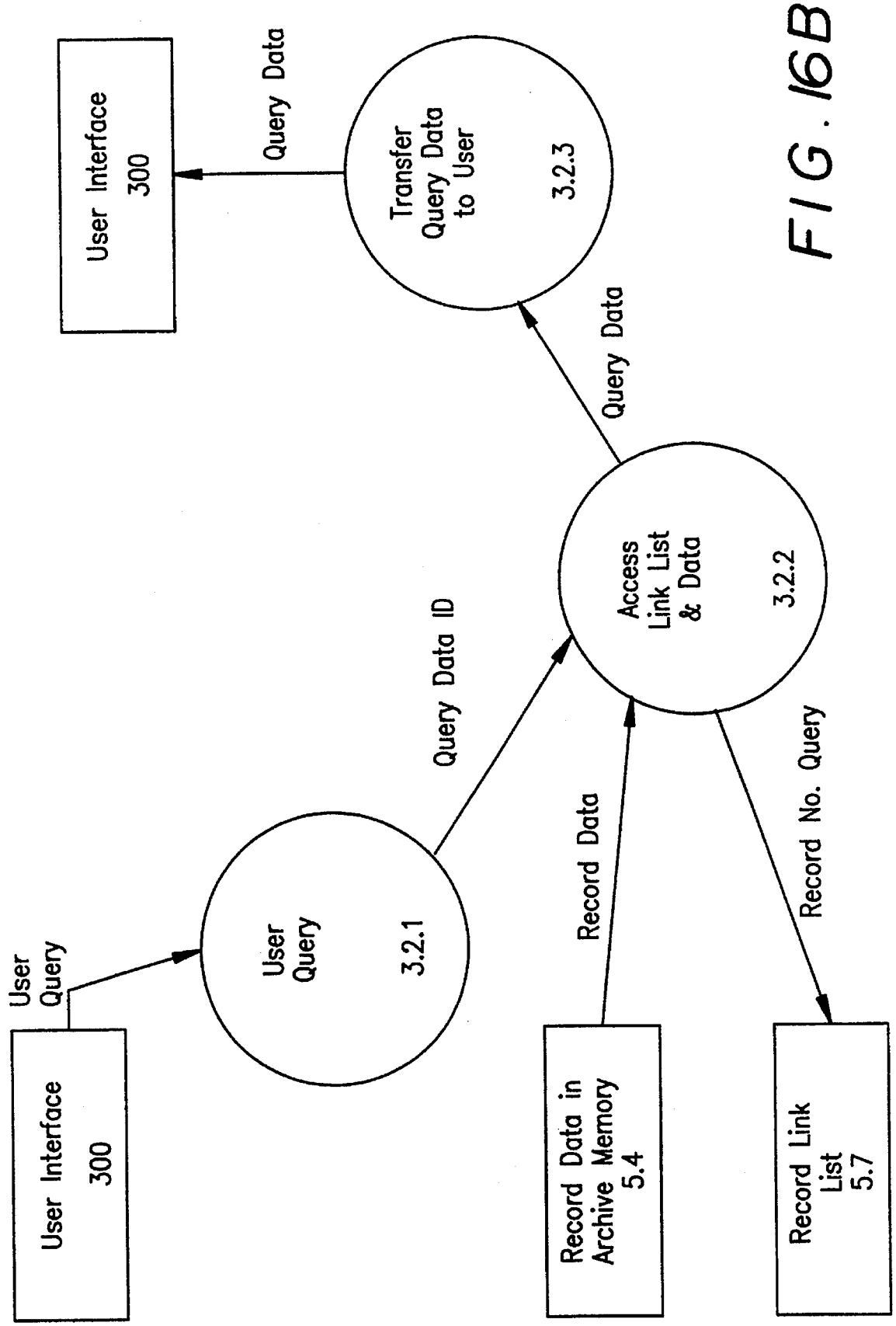

The DP (2.0) shall provide the data processing for the complete system or for the individual system at its level, depending on the Loading Level and the priority levied for each process. The priorities and loading levels are determined at the Planning Phase before initiation of the Operating time period. The Control flow diagram for the DP is shown by FIG. 15, C3M2 Control Flow Diagram DP.

The IFPO for the DP is shown by Table 4-2.

TABLE 4-2

Data Processing (DP) Requirements
INPUT FUNCTION/PROCESS OUTPUT (IFPO)
(Baseline Data Processing Requirements)

| Inputs | | Functions | | Outputs | |
|---|---|---|---|---|---|
| A. | Surface Craft | 1. | Scan the Link List and process the next record. | 1. | Transfer derived data of first data to KB. |
| 1. | Range and Bearing | 2. | Convert Range and Bearing to X, Y, Z. | | |
| 2. | Data from external Reference data | 3. | Process the algorithms required for the record. | 2. | Transfer Dynamic Calculated Data to Concurrent Memory |
| 3. | Link List maintained by IO Process | 4 | Reset the status bit(s) indicating the DP process is completed. | 3. | Update Link list |
| 4. | Ref. data from KB | 5. | Maintain a count of the number of records. | 4. | Update Data Record Count |
| B. | Special Vehicles | 1. | Scan the Link List and process the next record. | 1. | Transfer derived data of first data to KB. |
| 1. | Range and Bearing | 2. | Convert Range and Bearing to X, Y, Z. | | |
| 2. | Data from external Reference data | 3. | Process the algorithms required for the record. | 2. | Transfer Dynamic Calculated Data to Concurrent Memory |
| 3. | Link List maintained by IO Process | 4 | Reset the status bit(s) indicating the DP process is completed. | 3. | Update Link List |
| 4. | Ref. data from KB | 5. | Maintain a count of the number of records. | 4. | Update Data Record Count |
| C. | Aircraft | 1. | Scan the Link List and process the next record. | 1. | Transfer derived data of first data to KB. |
| 1. | Range and Bearing | 2. | Convert Range and Bearing to X, Y, Z. | | |
| 2. | Data from external Reference data | 3. | Process the algorithms required for the record. | 2. | Transfer Dynamic Calculated Data to Concurrent Memory |
| 3. | Link List maintained by IO Process | 4 | Reset the status bit(s) indicating the DP process is completed. | 3. | Update Link List |
| 4. | Ref. data from KB | 5. | Maintain a count of the number of records. | 4. | Update Data Record Count |
| D. | Short Range Missiles | 1. | Scan the Link List and process the next record. | 1. | Transfer derived data of first data to KB. |
| 1. | Range and Bearing | 2. | Convert Range and Bearing to X, Y, Z. | | |
| 2. | Data from external Reference data | 3. | Process the algorithms required for the record. | 2. | Transfer Dynamic Calculated Data to Concurrent Memory |
| 3. | Link List maintained by IO Process | 4 | Reset the status bit(s) indicating the DP process is completed. | 3. | Update Link List |
| 4. | Ref. data from KB | 5. | Maintain a count of the number of records. | 4. | Update Data Record Count |
| E. | Long Range Missiles | 1. | Scan the Link List and process the next record. | 1. | Transfer derived data of first |

TABLE 4-2-continued

| | | |
|---|---|---|
| 1. Range and Bearing | 2. Convert Range and Bearing to X, Y, Z. | data to KB. |
| 2. Data from external Reference data | 3. Process the algorithms required for the record. | 2. Transfer Dynamic Calculated Data to Concurrent Memory |
| 3. Link List maintained by IO Process | 4 Reset the status bit(s) indicating the DP process is completed. | 3. Update Link List |
| 4. Ref. data from KB | 5. Maintain a count of the number of records. | 4. Update Data Record Count |

Processing

1. Next Record for Processing (2.1)
a. Scan Data Ready Flags in OBJ Memory (5.1).
b. Provide Next Record No. by Priority and Schedule to "Get Current Record" Module (2.2).
2. Get Current Record (2.2)
a. Retrieve the Next Record from the OBJ Memory (5.1).
3. Get Prior Record (2.3)
a. Provide Prior Object Data Value and Time Stamp from OBJ Memory (5.1) to Calculation Module (2.4).
4. Calculations (2.4)
a. Compare current value with Prior Value plus Trend Value; if equal then processing is not required.
b. If processing is required then complete the process, each class and type has its own process.
c. If object Identity or Decision Support is required; forward the Object Type and its attributes to KB.
d. Retrieve Decision Data from the KB.
e. Store Calculated Data and Decision Data in Calculated Data Database (5.3).

Processing actions of the Control flow diagram are described in the processing section of the IFPO. Data transferred to the DP will be dynamic data, Data Records, data words for Alarm Conditions and appropriate data for priority designations or requests. Static Data sources will be identified at the initiation of Operating time periods and will consist of Database and Field Identities, Address Locations, storage instructions, and destinations for the data. Interfaces of the DP are the Congruent Memory and the Knowledgebase. All modules in the DP shall be reusable, resides in a Library, are memory resident, and operated in a priority sequence for blocks of data or Alarm Data. The DP shall complete its current cycle before the initiation of any following sequences.

The Real Time DM (3.0) shall provide the Active Real Time Data repository for the system, provides an active interface with the IO, Data storage, Graphic user interface and Users, provides the proper formatted data for displays, reports and external data sources. The Control flow diagrams for the Real Time DM are 16.1 (User Data) and 16.2 (Query Data).

The IFPO's for the Real Time DM are shown in Table 4-3.1 for User Data and 4-3.2 for Query Data.

TABLE 4-3.1

DATA MEMORY (DM) Requirements (User Data)
INPUT FUNCTION/PROCESS OUTPUT (IFPO)
(Baseline DM Requirements-User Data)

| Inputs | Functions | Outputs |
|---|---|---|
| A. Surface Craft Real-Time Track Data in Congruent Memory (CM) | 1. Sample the desired real-time track data in the CM<br>2. Forward any Alarm or Critical info to the Cognizant Users and display the info on required displays<br>3. Provide the selected displays for all users and displays and maintain the updates of the displays with the current applicable data. | 1. Provide required Alarms and Info to the required Users and displays<br>2. Initialize and update al displays requested by the users. Updates to be on a cyclic basis. using current real-time data. |
| B. SP Vehicles Real-Time Track Data in Congruent Memory (CM) | 1. Sample the desired real-time track data in the CM<br>2. Forward any Alarm or Critical info to the Cognizant Users and display the info on required displays<br>3. Provide the selected displays for all users and displays and maintain the updates of the displays with the current applicable data. | 1. Provide require Alarms and info to the required Users and displays<br>2. Initialize and update al displays requested by the users. Updates to be on a cyclic basis. using current real-time data. |
| C. Aircraft Real-Time Track Data in Congruent Memory (CM) | 1. Sample the desired real-time track data in the CM<br>2. Forward any Alarm or Critical info to the Cognizant Users and display the info on required displays<br>3. Provide the selected displays for all users and displays and maintain the updates of the displays with the current applicable data. | 1. Provide required Alarms and info to the required Users and displays<br>2. Initialize and update al displays requested by the users. Updates to be on a cyclic basis. using current real-time data. |
| D. Short Range Missile Real-Time Track Data in Congruent Memory (CM) | 1. Sample the desired real-time track data in the CM<br>2. Forward any Alarm or Critical info to the Cognizant Users and display the info on required displays<br>3. Provide the selected displays for all users and displays and maintain the updates of the displays with the current applicable data. | 1. Provide required Alarms and info to the required Users and displays<br>2. Initialize and update al displays requested by the users. Updates to be on a cyclic |

TABLE 4-3.1-continued

| | | | |
|---|---|---|---|
| E. Long Range Missile Real-Time Track Data in Congruent Memory (CM) | 1. Sample the desired real-time track data in the CM<br>2. Forward any Alarm or Critical info to the Cognizant Users and display the info on required displays<br>3. Provide the selected displays for all users and displays and maintain the updates of the displays with the current applicable data. | | basis. using current real-time data.<br>1. Provide required Alarms and info to the required Users and displays<br>2. Initialize and update al displays requested by the users. Updates to be on a cyclic basis. using current real-time data. |

Processing:

1. Process User Data (3.2.1)
a. Retrieve the updated Record No. of the R/L Memory (5.7) and reset the Update Flag of the Record Link List.
b. Retrieve the Archieve Record data from the Archieve memory.
c. Format the data to the Users requirement.
d. Transfer the data to temporary storage for Users Updated Data (3.1.3).
e. Retrieve Priority data from the R/L Memory (5.7) and reset the Priority Flag.
f. Formats the Alarm, Alert or Trigger Messages and transfers to the User Priority Data Module (3.1.2).
2. User Priority Data (3.1.2)
a. Provides temporary storage for Priority, Triggers, Alarms and Notices data.
b. Notifies Transfer Module (3.2.4) that Priority Data is available and sets Priority Flag.
3. User Record Data (3.12.3)
a. Provides temporary data storage for data records and record updates.
b. Notifies Transfer Module (3.2.4) that record data is available and sets Data Record Flag.
4. Transfer Data (3.1.4)
a. Retrieves record data from temporary storage and resets the Data Record Flag.
b. Retrieves the Priority Data from temporary storage and resets the Priority Flag.
c. Transfers the received in formation to the Users Interface (300) on a priority and schedule basis.

TABLE 4-3.2

DATA MEMORY (DM) Requirements (Query Data)
INPUT FUNCTION/PROCESS OUTPUT (IFPO)
(DM Requirements - Query)

| Inputs | Functions | Outputs |
|---|---|---|
| A. Surface Craft<br>User query, i.e. consisting of Track number the Start and Stop Time.<br>Archived track data file, CM or archive media or both and the Link List for each track.. | 1. User Query request consisting of Track ID & Time period or other queries that correspond to SQL3.<br>2. Access the Linl List for Track or other Quiery Data requested by the User.<br>3. Scan the Link List for the Record numbers and/or columns corresponding to the time intervals or data requested by the user.<br>4. Retrieve all selected data queried by the User. | 1. All track or query data, with each record or set of data furnished in a FIFO sequence. |
| B. Special Vehicle<br>User query, i.e., consisting of Track number the Start and Stop Time.<br>Archived track data file, CM or archive media or both, and the Link List for each track.. | 1. User Query request consisting of Track ID & Time period or other queries that correspond to SQL3.<br>2. Access the Linl List for Track or other Quiery Data requested by the User.<br>3. Scan the Link List for the Record numbers and/or columns corresponding to the time intervals or data requested by the user.<br>4. Retrieve all selected data queried by the User. | 1. All track or query data, with each record or set of data furnished in a FIFO sequence. |
| C. Aircraft<br>User query, i.e. consisting of Track number the Start and Stop Time.<br>Archived track data file, CM or archive media or both, and the Link List for each track.. | 1. User Query request consisting of Track ID & Time period or other queries that correspond to SQL3.<br>2. Access the Linl List for Track or other Quiery Data requested by the User.<br>3. Scan the Link List for the Record numbers and/or columns corresponding to the time intervals or data requested by the user.<br>4. Retrieve all selected data queried by the User. | 1. All track or query data, with each record or set of data furnished in a FIFO sequence. |
| D. Short Range Missile<br>User query, i.e. consisting of Track number the Start and Stop Time.<br>Archived track data file, CM or archive media or both, and the Link List for each track.. | 1. User Query request consisting of Track ID & Time period or other queries that correspond to SQL3.<br>2. Access the Linl List for Track or other Quiery Data requested by the User.<br>3. Scan the Link List for the Record numbers and/or columns corresponding to the time intervals or data requested by the user.<br>4. Retrieve all selected data queried by the User. | 1. All track or query data, with each record or set of data furnished in a FIFO sequence. |
| E. Long Range Missile<br>User query, i.e. consisting of Track number the Start and Stop Time.<br>Archieve track data file, CM or archive media or both, and | 1. User Query request consisting of Track ID & Time period or other queries that correspond to SQL3.<br>2. Access the Linl List for Track or other Quiery Data requested by the User.<br>3. Scan the Link List for the Record numbers and/or columns corresponding to the time intervals or | 1. All track or query data, with each record or set of data furnished in a FIFO sequence. |

TABLE 4-3.2-continued

| the Link List for each track.. | data requested by the user. |
| | 4. Retrieve all selected data queried by the User. |

Processing:

1. User Query (3.2.1)
a. Retrieve User Query from the User Interface (300)
b. Process the query for proper Format, ID, and transfer to the Access Query Data Module (3.2.2)
2. Access Query Data (3.2.2)
a. Accesses Record Link List (5.7) for Query Data Record Numbers.
b. Retrieves Query records from the Archive memory (5.4).
c. Transfers the Query records to the Transfer Module (3.2.3).
3. Transfer Module (3.2.3)
a. Provides temporary storage for the Query record data.
b. Transfers the Query records to the User interface (300) on a cyclic scheduled basis.

---

The processing steps for the Control flow diagrams are shown in the Processing Section of the IFPO. All data transfers shall be by File and Records or memory pages and not by individual active data words. Memory locations are designated by the link lists during initial configuration and include all dynamic and static data. The data repository for the Real Time DM is part of the Congruent Memory. The Partitioned Data Storage (PDS) areas are for each individual track or object, which may be grouped for displays or reports as selected by the User. The data is transferred to the Real Time DM allocations from the Real-time/Critical-time segments of the Congruent Memory and Data Archive Media. All data updates for the PDS are from the latest data samples of each applicable data record. Displays, reports and User notifications occur within milliseconds from the arrival time of the event or occurrence. The slowest response of the entire system will be by the user in observations or actuation. The updates for the Real Time DM will occur concurrently with the updates for the Data archive Media. The outputs and input requests could number in the thousands but for any one instance would probably be in the hundreds. The process duration could be from minutes, to hours to days depending on the class of objects or targets. The Real Time DM would also be the respondent for Weapons and tactical systems.

The Data Storage (4.0) can be described as a database that responds to a "Direct Access" or Structured query language type query. The database shall consist of portions of the Congruent Memory (5.0) and other storage media. The Data storage shall a collection of "Flat Files" that shall be the repository of all static and dynamic data in the system. The data storage record formats shall contain all of the data required to identify all input data types, all output data types, and reference data parameters or algorithms (i.e. Calibration Data, Processing Instructions, & etc.). The data shall be stored in "Static and Dynamic" locations. The Static Data will be a one time entry (persistent data) and the Dynamic Data will be the Real Time plus any Processed data. The Process requiring access to these data record sets is the Real Time DM (3.0). Interfaces to the Data storage are the Congruent memory, Data Archive media and the Real Time DM. The Control flow diagram for the Data storage is contained in FIG. 17.

The IFPO for the Data storage is Table 4-4, Data Storage Requirements.

TABLE 4-4

Data Storage (DS) Requirements
INPUT FUNCTION/PROCESS OUTPUT (IFPO)
(Baseline DS Requirements)

| Inputs | Functions | Outputs |
| --- | --- | --- |
| A. Surface Craft<br>Real-time track or object data to Concurrent Memory Record Numbers | 1. Monitors the real-time object or track data in the Concurrent Memory & their Record Numbers<br>2. Provides any alarm or data information messages the Users or Query Users.<br>3. Initialize and update displays and reports for the On-Line Users. | 1. Real-time Alarms, Alerts, and Information Messages,<br>2. Real-time displays and reports for On-Line Users. |
| B. SP Vehicles<br>Real-time track or object data to Concurrent Memory Record Numbers | 1. Monitors the real-time object or track data in the Concurrent Memory & their Record Numbers<br>2. Provides any alarm or data information messages the Users or Query Users.<br>3. Initialize and update displays and reports for the On-Line Users. | 1. Real-time Alarms, Alerts, and Information Messages,<br>2. Real-time displays and reports for On-Line Users.<br>3. Real-time Archive to Archive Media |
| C. Aircraft<br>Real-time track or object data to Concurrent Memory Record Numbers | 1. Monitors the real-time object or track data in the Concurrent Memory & their Record Numbers<br>2. Provides any alarm or data information messages the Users or Query Users.<br>3. Initialize and update displays and reports for the On-Line Users. | 1. Real-time Alarms, Alerts, and Information Messages,<br>2. Real-time displays and reports for On-Line Users.<br>3. Real-time Archive to Archive Media |
| D. Short Range Missiles<br>Real-time track or object data to Concurrent Memory Record Numbers | 1. Monitors the real-time object or track data in the Concurrent Memory & their Record Numbers<br>2. Provides any alarm or data information messages the Users or Query Users.<br>3. Initialize and update displays and reports for the | 1. Real-time Alarms, Alerts, and Information Messages,<br>2. Real-time displays and reports for On-Line Users.<br>3. Real-time Archive to Archive |

TABLE 4-4-continued

|  |  | On-Line Users. |  | Media |
|---|---|---|---|---|
| E. | Long Range Missile Real-time track or object data to Concurrent Memory Record Numbers | 1. Monitors the real-time object or track data in the Concurrent Memory & their Record Numbers<br>2. Provides any alarm or data information messages the Users or Query Users.<br>3. Initialize and update displays and reports for the On-Line Users. | 1. Real-time Alarms, Alerts, and Information Messages,<br>2. Real-time displays and reports for On-Line Users.<br>3. Real-time Archive to Archive Media |

Processing:

1. Record Count in Archive Media (4.1)
a. Retrieve the updated Data Object data list for Object Records and reset the updated data Flag.
b. Transfer the updated Record No.'s to the Access Data in Memory (4.2) Module.
2. Access Data in Memory Module (4.2)
a. Retrieve the Object Data Records from the Object Data Memory (5.1).
b. Retrieve the Calculated Data Records from the Calculated Data Memory (5.3).
c. Format the data into the prescribed RDB format for the Class, Type and Object.
d. Transfer the RDB format records to the Transfer Records Module (4.3).
3. Transfer Records (4.3)
a. Assigns sequential record numbers to each record for each class and type.
b. Transfers the last updated RDB Records to the Archive Memory Database (5.4).
4. Transfer Records Between Archive Media (4.4)
a. Processes Transfer Trigger from DM (30).
b. Transfer the prescribed number of records from the Archive Memory Database (5.4) to the Archive Media (400).
c. Processes Retrieve Trigger from DM (30).
d. Transfers the prescribed number of records from the Archive Media (400) to the Archive Memory (5.4).

Figure 17:
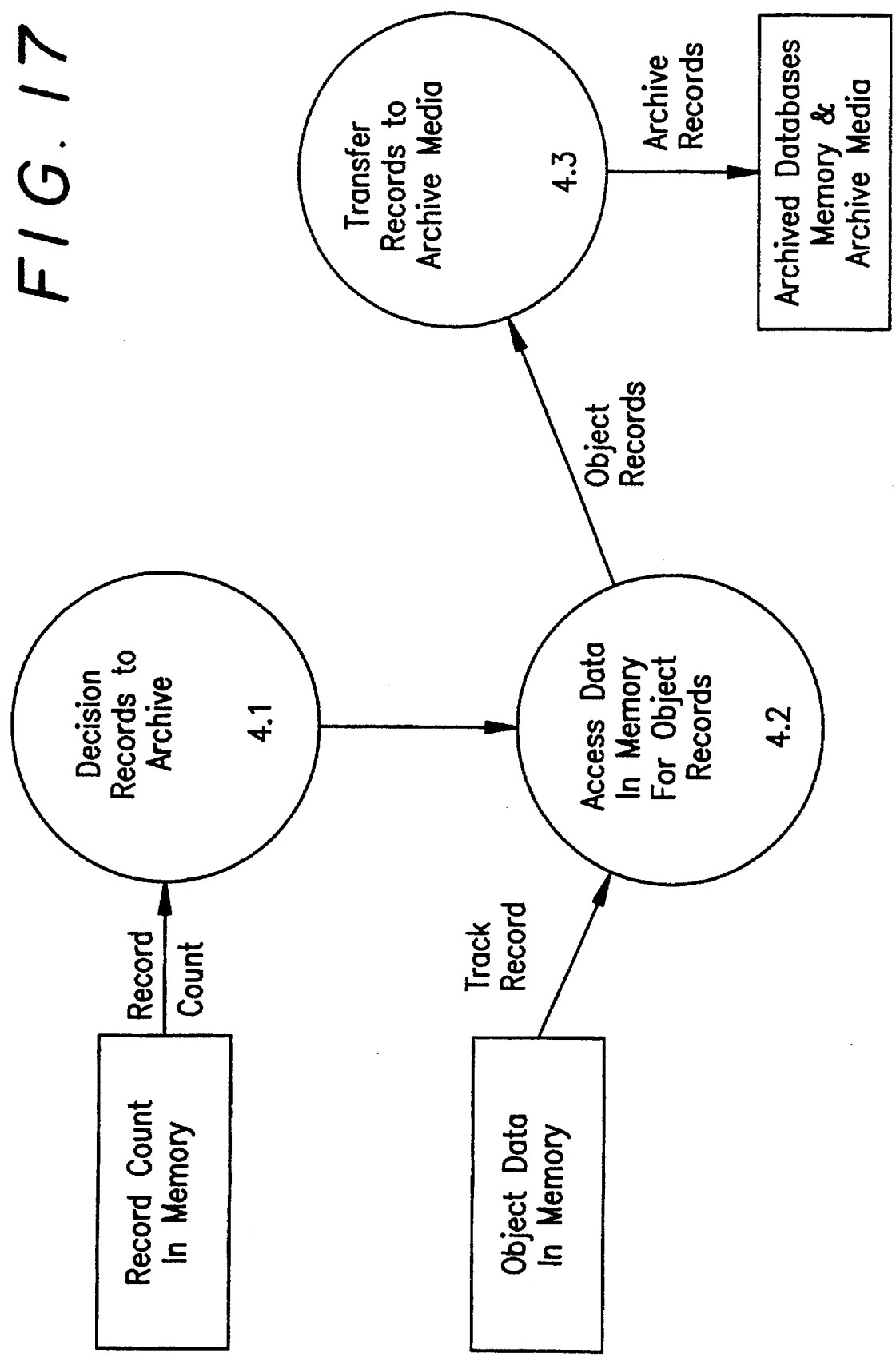

The processing steps for the Control flow diagram, FIG. 17, are contained in the processing section of Table 4-4. The initial Data Dictionary and Structure of the Data Records shall be completed and documented from User Procedures and Standards and from documents provided by associated sources. The Data storage shall have IO Link List and pointer address information for all Data storage applications and data files. The processor shall control and schedule all external request for data, monitor and record all data inputs, record all requests for data, verify that the data requestor is authorized and provide an audit trail for all data access requests.

Figure 18:
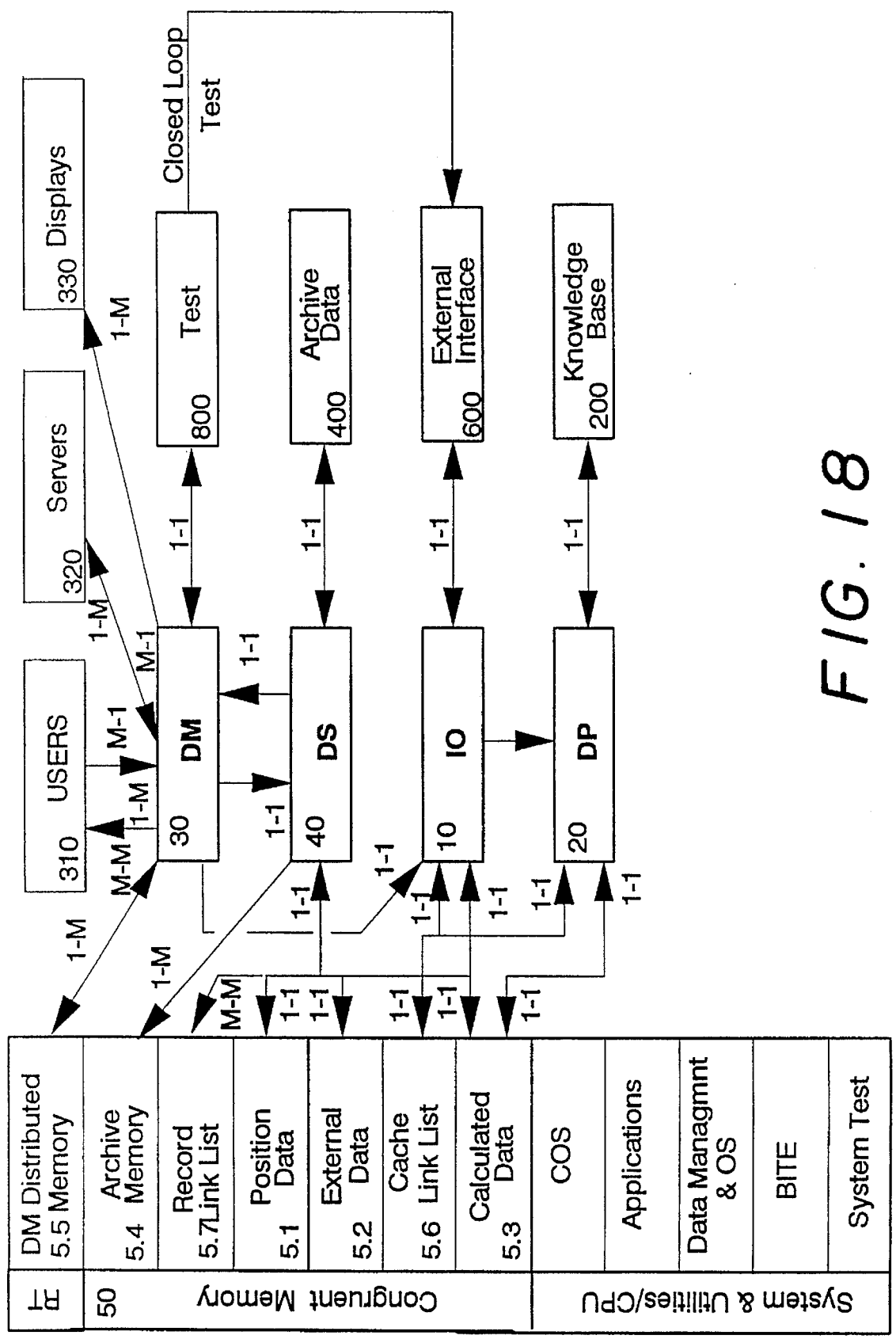
Figure 19:
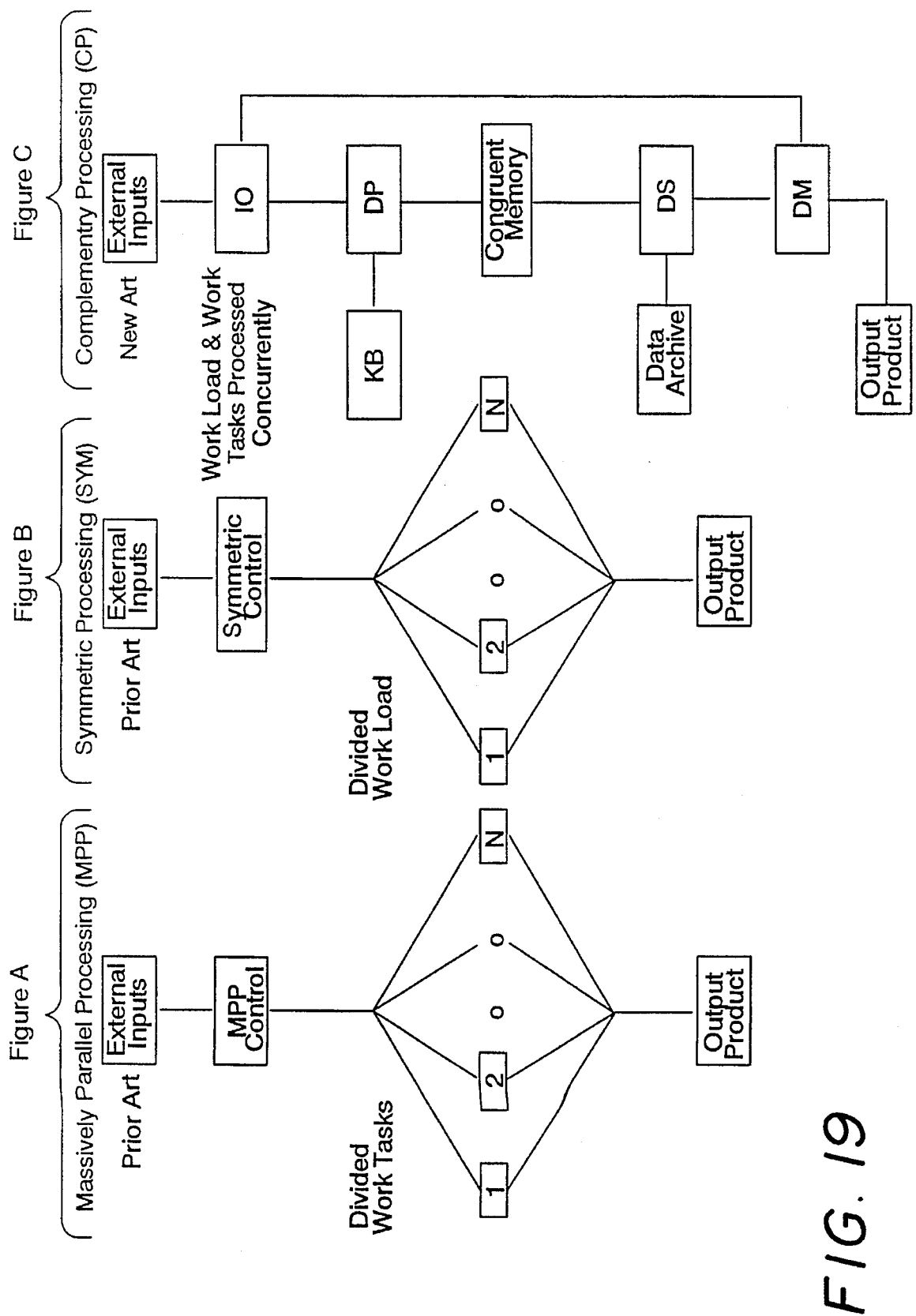

The C3M2 System must be configured to meet Operations requirements. This evolves around the basic Software systems requirements, i.e. inputs-sources, functions/processing-data sets, and outputs-archived memory allocations. In C3M2 terminology it involves the IO-Input, DP, IO/DP/DS/Real Time DM-Functions, and Data storage-Memory Allocation for persistent or archived data. This sequence of events is depicted by FIG. 18, Sources, Data Sets and Memory Allocation.

The external Interface (600) provides the communications data links to the IO (10). The communications interface will be standard communications interfaces that are concentrated by HUBS or Concentrators. The communications links and message headers will identify the data source and class of data to the IO. The data sources include Sensor, acquisition, Comm. Links, Comm. I/F's, Remote data access, DDMS and Test Data. The Test Data will be generated by the C3M2 System and will be a Closed Loop test of the C3M2 system, a communications port that is connected to an external port on the External Interface or routed to a remote source for re-transmission to the External Interface for communication link tests.

The data sets are routed from the External Interface (600) the IO (10). The IO identifies the Source, the class of data, determines that the data is Dynamic or Static, determines that the data requires or does not require processing, and applies a track or data number if one has not been assigned. The data is then exchanged with the External Data Memory (5.2) or the DP (20), the Position Data Memory (5.1), and updates the Object Link List (5.6). The DP processes the available data (a flag was set in the Object Link List (5.6) that the data was available) with processing required for that class of data. This calculated data is then exchanged with the Calculated Data (5.3) by the DP (20). The DP (20) will also exchange the initial calculated attribute data with the Knowledgebase (200). The knowledge base will use existing Reference Data and current target or signature data to attempt to perform identification of the request. The Knowledgebase (200) will respond to the DP (20) in a small number of milliseconds. The DP (20) and Knowledgebase (200) will also respond to Alarms, Notices, Critical Events and other Attention Occurrences to the Real Time DM (30) in 100's of MicroSeconds. Processed Data is now available for C3M2 use in 100's of Microseconds after arrival at the External Interface (600). The Real Time DM (30) will monitor the Record Link List (5.7) for new updates and update all User Data Files (310), Servers (320), and Displays (330) being maintained by the Real Time DM (30). All current displays, reports and files requiring dynamic updates are maintained by the Real Time DM (30) in the real-time Real Time DM (5.5). The DS (40) maintains all dynamic and static data in the system by source and sequential track/data number and in the time sequence of the time stamp associated with each individual data sample. The data is transferred from the Position (5.1) and Calculated (5.3) Data on a cyclic basis determined in the planning phase (from 100's of microseconds to seconds or minutes). The External Data (5.2) will be transferred to the applicable track or data number upon receipt (100's MicroSeconds). Data will be exchanged with the Archive Media (400) by the DS (40) on a cyclic basis, to be determined during the Planning Phase. This time frame could be a large number of minutes, hours or days. Due to the dynamic concurrent operations of the C3M2 System all of these actions can occur in realtime without system waits or interrupts. The Memory allocation of the Congruent Memory (50) is comprised of 7 memories of various sizes and allocations. The memory size normally is a product of 2, i.e. 8, 16, 32, 64, 128, 512, 1024. The maximum memory size for processors, under consideration, is 1 Giga-Byte (GB). The internal storage size is 32 GB. The latency time for internal memory is in the order of Nano-Seconds while the internal storage is in the order of multiple milliseconds. External DS is in the order of TeraBytes (TB). The internal memory is normally segmented into pages of 4096 Bytes or a maximum of 250,000 pages per CPU. The maximum memory for a four CPU configuration is 4 GB. The seven memories are shown in FIG. 18. Each dedicated memory is allocated its memory size during the Planning Phase but could be readily adjustable.

How to make and use a preferred embodiment of the invention is further illustrated by the following examples.

EXAMPLE I

The system operations capabilities shall include:
A communication interface with the data sources of interest.
Providing data of interest to Operational Users.
The data of interest includes Operations, Modeling, Simulation, Training and Operations Planning.
Output data is provided to Large Screen Displays, Work Stations, Queries and External Users.
Planning phase to identify and Import Data from all known database of interest.
Menus will be provided for all identified databases, their data fields & related columns, operations scenarios, and C3M2 Operations
Display screens to be defined in the planning phase.
Index and link list for External Databases (RDA) to be prepared during the planning phase.
Planning phase to be two or more hours prior to Operations Testing.
Active Data to be the Dynamic data provided by Sensors, Data Acquisition Devices and other Real-Time devices.
Reference Data to be the support data provided by Users and other remote databases for use in identifying, supporting or describing the Dynamic Data.

The System shall have the capability to receive and analyze data from a large number of classes and objects. The input data being used for throughput and sizing is shown by FIG. 1, C3M2 System Domain. The data contemplated for inputs to the C3M2 (100) are Communications Links that interface with the External Interfaces (600). The data on these communication links include acquisition data, sensor data, data files, or portions of data bases. The data inputs can be Real Time Data (Dynamic) or Descriptive Support Data (Static). The Internal interfaces include the User Interface (330), Data Archive (400) and the Knowledge Base (400). The Archive Media shown is over and above the Gigabyte data storage of the C3M2. The KB provides the decision support for the C3M2 System.

The current mode of operations utilizes databases as a separate entity from system applications. Separate stand alone queries are used to obtain any desired data. This method of operations utilizes the Operating System extensively, along with a large number of computer operations for interrupts and context switching. The Overhead (OH) of current Operating Systems is normally larger than 50%. Current operating system methodology requires special software applications for Multi-Tasking and Multi-Processing. This adds to the operating system overhead and decreases the effectivity of the Processor. This also adds new procedures which also delays the software processing. These procedures are Preemptive Interrupts, Exceptions, Wait States, Cycle Sharing and Task Sharing. Multi-Processing also adds two new terms and procedures, i.e. Massively Parallel Processing (MPP) and Symmetrical Processing (SMP). MPP configurations share work tasks and each processor has its own memory. The SMP share work loads and have a common memory. SMP works better when the Processors are less than 10 and the MPP when the processors are more than 10. Either process complicates the Operating System and Applications software. Some experts predict that it will take software Engineers 20 years to advance as far as the hardware engineers in Operating System and Multi-Processing.

Figure 2:
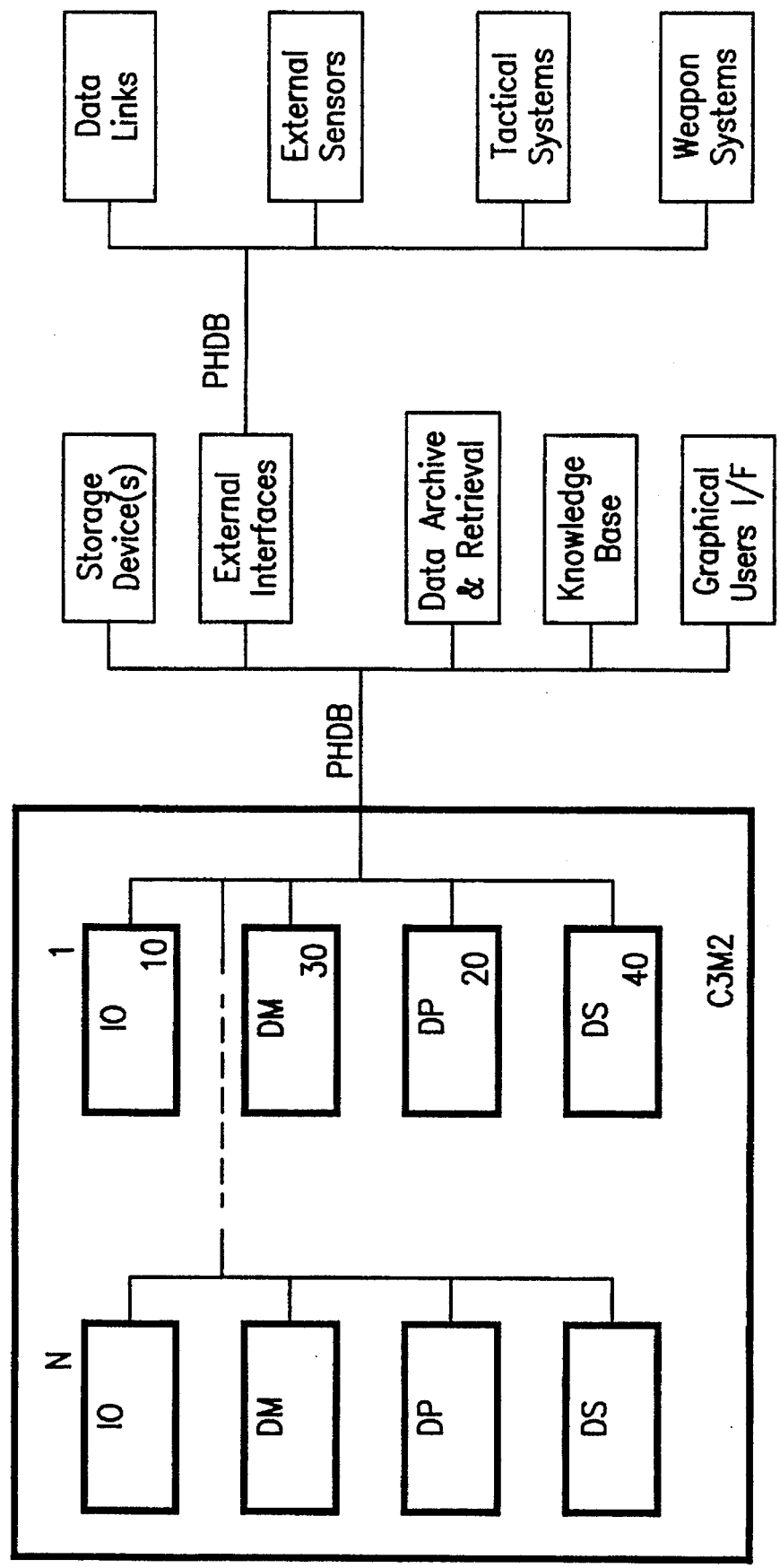
Figure 3:
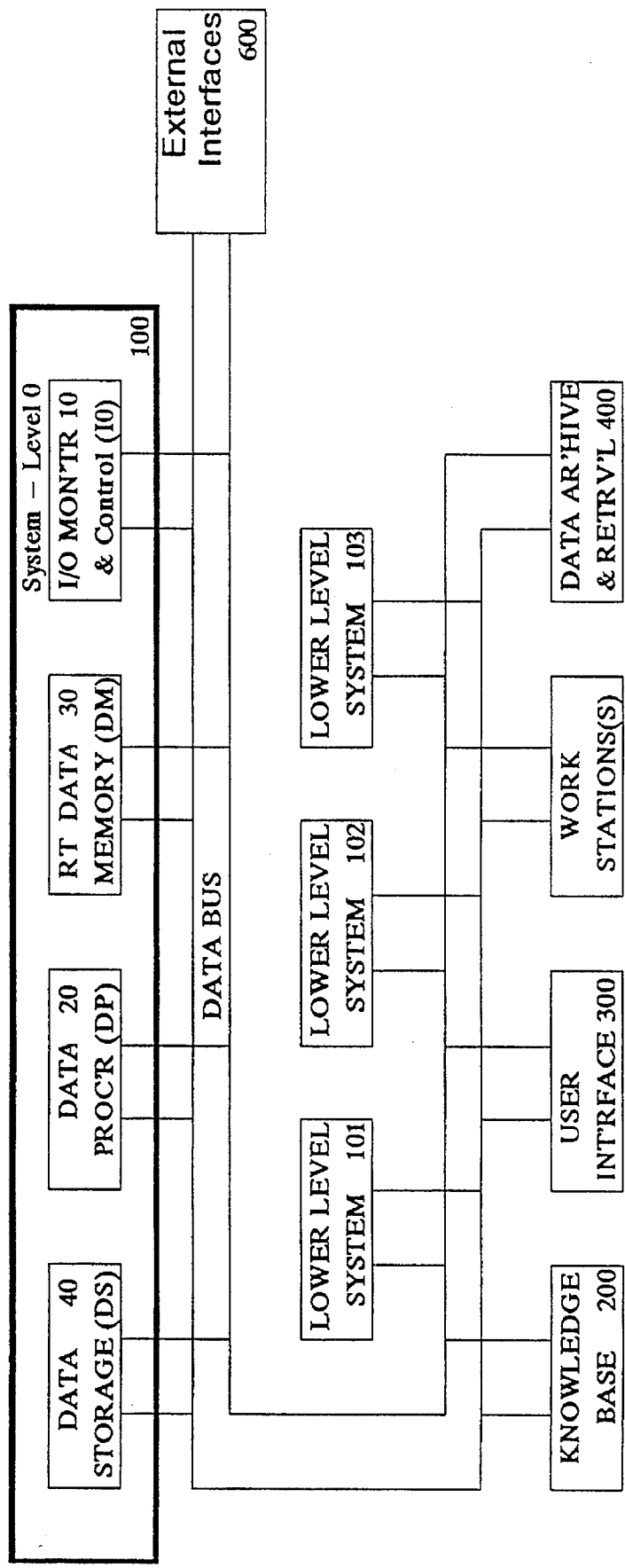

The planned mode of operations for C3M2 will not depend on the Operating System for operations or the compiler for addresses. The planned system configuration requires multiple processors for performance of complementary system functions, i.e. IO, DM, DP, DS. The separate but integrated processes will permit a simpler performance of Information and data processing applications using COTS equipments and modules (hardware & software). The COTS hardware and software can be configured into System, Subsystems, hardware Subsystems, software Subsystems, equipments or modules. This mode of configurations is made possible by the design methodology and the planned allocation of functions in the software and the hardware. The system design philosophy will also allow for a large number of data types for Objects, Targets, Triggers, Alarms, Critical Events, ADT's or BLOBS. This is accomplished through Task Inter-Leaving and Priority Insertion. The Priority Insertion of data into the data being processed can be accomplished without the data process being interrupted but it is delayed one instruction time. The replication of each system function will have interfaces to its complementary components in the system but may require configuration for that individual application. The baseline system will have a capability of approximately 1.6 Gigaflops. The systems data bus is 64-Bits wide. The system operates in a complementary fashion and each processor or baseline system can be connected in series, parallel or both as the requirements dictate. The baseline system can also be configured for a Multi-Level System with Multi-Gigaflop capability. The Block Diagram of the System Concept is shown by FIG. 2, C3M2 Systems Conceptual Drawing. The Multiple Level configurations are shown by FIG. 3, C3M2 System Block Diagram. The Hardware (hardware) and the software components shall be replicated by system until every data input parameter is reduced to its lowest usable form and archived. The software replication and configuration of system levels are shown by FIG. 4, Replicated System Expansion, Serial-Parallel-or-Both.

The system concept shown by FIG. 2 is to list all of the potential interfaces of the system and their inter-connections. The method shown is for Parallel High Speed Buses (PHDB) of 32 or 64 bits. The Futurebus+ or PCI fulfills this requirement. The fiber-optics interface provides the noise free environment. The parallel data bus interfaces the IO function (10) to local interfaces of the GUI (330), Knowledge Base (200), External I/F (600) and Storage Devices (300)in the Multi Hundred MB Range. The External Interface will interface with external data sources and users on fiber-optics links of 100 Megabits per second. The external interface covers a wide variety of users and accomplishes this in Critical time periods, with the only constraint being the communications latent time. The system bus connecting the CPU's, i.e., IO (10), DP (20), DM (30), and DS (40), is 667 MB/Sec. The biggest deterrent to Real-Time/Critical-Time data processing is the external communications times to external data sources. Synchronous satellites will insert time delays of seconds. The system block diagram is used to show the flexibility of cascading baseline system configurations. The configured system, shown in FIG. 3, could be of an overall system and its subsystems or a large system with many multi-processing requirements. The External Interface (600) would be interconnected to any or all of the external devices shown in FIG. 2. The data bus interconnecting Level 0 (100), Level 1 (101), Level 2 (102) and Level 3 (103) will have a throughput of 150 to 300 MegaByte (MB) Range. Local support devices, KB (200), Client/server (700), Work Stations (300) and Data Archival (400) will share the same data bus. This is a tremendous data path for data interchange since the systems bus for the CPU's, Congruent Memory (CM) and Discs are internal to each of the 4 CPU system configuration and operate at 667 MB second. Any of the Processors can be paralleled with the same type processor for fault tolerance or improved system performance.

Figure 4:
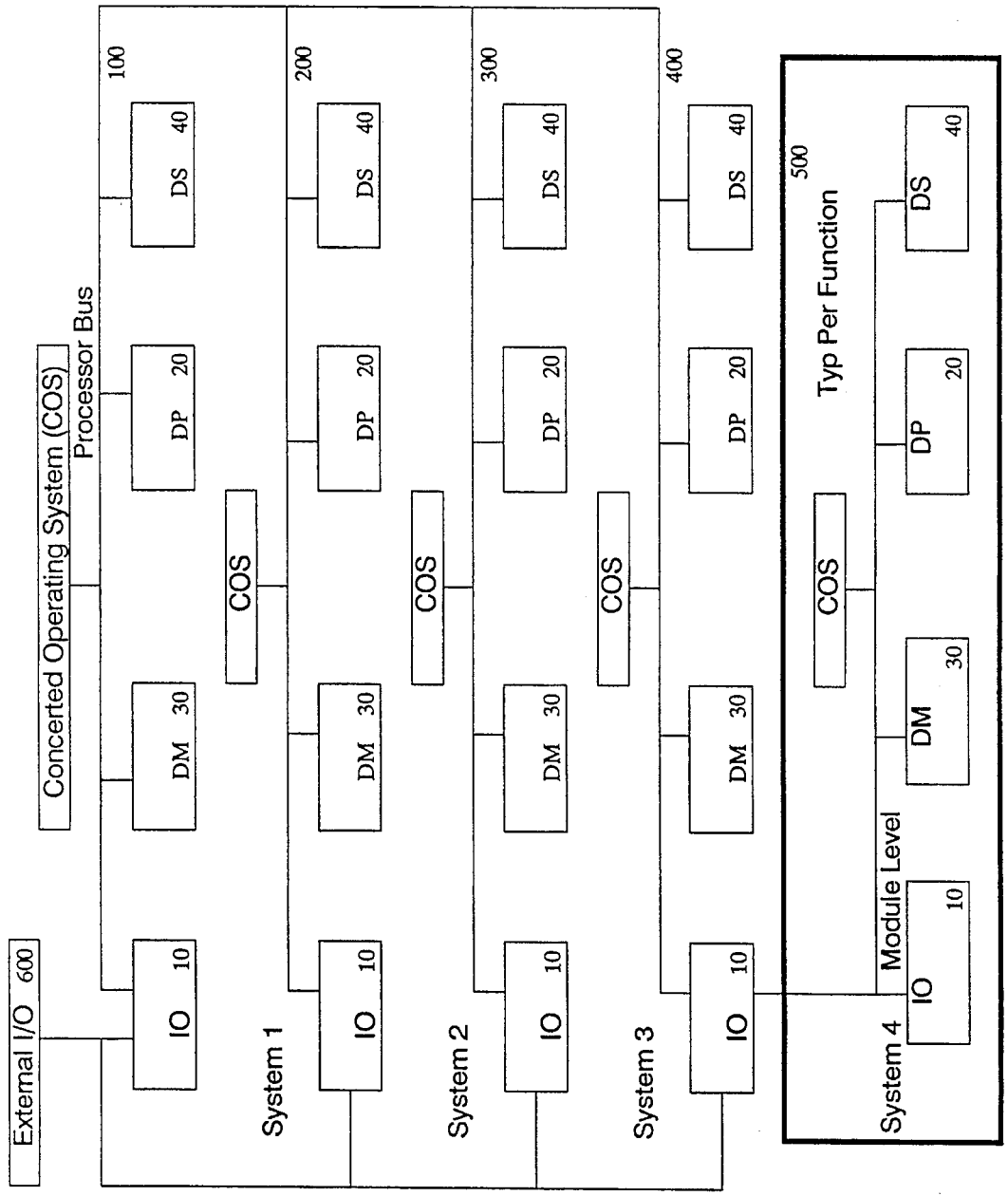

The system flexibility of the C3M2 system is shown in FIG. 4. The External Interface (600) serves as the interfaces to the world. The Ext. I/F is interconnected to the IO module in each level. Each level will only respond to messages addressed to it. The Ext. I/F could be the interface to a large number of inputs. The five levels of the system could be responding to separate interfaces and have interchanges of data between systems levels (100, 200, 300, 400, 500) or performing mathematical processing for some of the individual subsystems, i.e. multi-spectral scanning, synthetic antenna arrays, or side looking radars. Each processor in an array of processors can respond to any other processor in the system or to any external input through its IO.

The system criteria and methodology shall be based on meeting all system requirements, having robust response times, having compatible IO Interfaces, and having Multi-Media/User Friendly interfaces for the Users. Major systems criteria are:

1. The system shall be multi-tasking, (i.e. multiple tasks with cooperative processing in the current time period).
2. The system shall have multi-processors, (i.e. complementary functions performed by individual processors during the current time period).
3. The operations of the C3M2 systems/subsystems shall be concurrent, (i.e. all tasks and processes are being performed in the same time periods).
4. The architecture of the system shall use Multi-Processors having COS's that has been configured for the process that it is performing.
5. The COS's shall not use Preemption or have Wait States.
6. The system shall use COTS hardware and applicable COTS software.
7. The system methodology shall allow for design and validation as the system evolves.
8. The system design shall define all known data types prior to initialization of the design effort.
9. The Processors shall have 64-bit or 128-bit wide bus.
10. The system shall be tested as the system evolves.
11. The system shall be Fault Tolerant.
12. The MBTF shall be 10,000 hours for the system.
13. The system shall be capable of being Tempest Tested.
14. The system shall have Built-In-Test (BIT) equipment.

The system criteria will be used for defining the capabilities of the C3M2 that is being implemented. The design methodologies shall be tailored to achieve these goals and objectives. The Design Methodology requirements to meet the implementation goals are listed below:

1. The implementation effort shall use a design methodology (Rapid Prototyping) and Project Plan that defines all known work tasks to be performed during the implementation project life cycle.
2. The design methodology shall provide a document that lists all known data sources, formats, protocols and interfaces for use in systems designs.
3. The design methodology shall use replicated system functions, where applicable.
4. The modules shall be implemented, in Hardware Component and/or Software Modules (in the language desired by the designer) and shall be available for multiple uses in the system.
5. The proof of concept model shall use Ada for implementation of the software modules.
6. The system will be tested as it evolves and effectivity will be reviewed for potential improvement at different stages of implementation.
7. The C3M2 processes will be allocated and the design specifications and designs will be documented.
8. Specific functions will be implemented for Proof of Concept in the C3M2 System.

The design methodology of "Make-A-Plan" (MAP) evolved from Make-A-Schedule. The original emphasis was on detailing a schedule where all known work tasks are listed and the resources for accomplishing the schedule are listed. This was done to ensure that the labor estimates were accurate. With the advent of automated Project Management Tools (TIMELINE), it is much easier to formulate a MAP than it was originally to Make-A-Schedule.

Data being processed is subdivided into Dynamic and Static Data. All static data shall be entered during planned operations, is a one time entry and is persistent data. The Dynamic Data shall include the input parameters, their calculated components parameters from the KB and other changing data. The IO shall define the data storage requirements for each IO data parameter, a part of the C3M2 Dynamic and Static Records. Data storage and exchange requirements will include the Dynamic Data, the Static Data, the RDB or field formats, output formats, data and display parameters. The operations of the processes begin with the IO, progresses through the DP and KB process and finishes with the DS process. The DM process provides the System and External user interfaces. When the final process is completed the system will have performed one operational cycle for the required operational input parameters and will have stored and output all required data (i.e all required operational parameters stored in a data base, all required operations services completed, all data output reports completed and all User Screens updated).

The four complementary functions (IO, DM, DP, DS) shall have comparable functions at each system level (0 through N). Each processor or sets of processors for each level shall have a COS Executive which will be tailored for the Level of Operations in which it is operating. This COS shall configure and schedule the operations of the Data Inputs and Outputs, Data Storage requirements, Data Processing, and Data Display through the use of "Link Lists". After the first system operations, each succeeding process shall be accomplished with Systems Commands for similar system operations. The key to success for the system configurations and processing are the COS executives which can be replicated for each function. The number of operations will be limited for each function (i.e. IO, DM, DP and DS). Data types are always known and are a part of the Dynamic and Static or Reference data for each complementary function. Dynamic Data is defined as Operations data (Acquisition, Sensor, Measurement, Parameter & etc.) used to determine operational measurements during real-time periods. The data samples may change during each sample period. Static Data is defined as Support, performance or identity data obtained in Non-Critical Time periods for use in Critical Time Periods. The data does not change during each sample period. Each function shall have one or more processes that have one input and one output and will be very loosely coupled to the remainder of the system. Each process in each function can be changed or modified without affecting the rest of the processes or systems. The validity of each process, during operational periods, shall be verified at Built-in-Test- Equipment (BIT) to verify the operations of the process.

Figure 5:
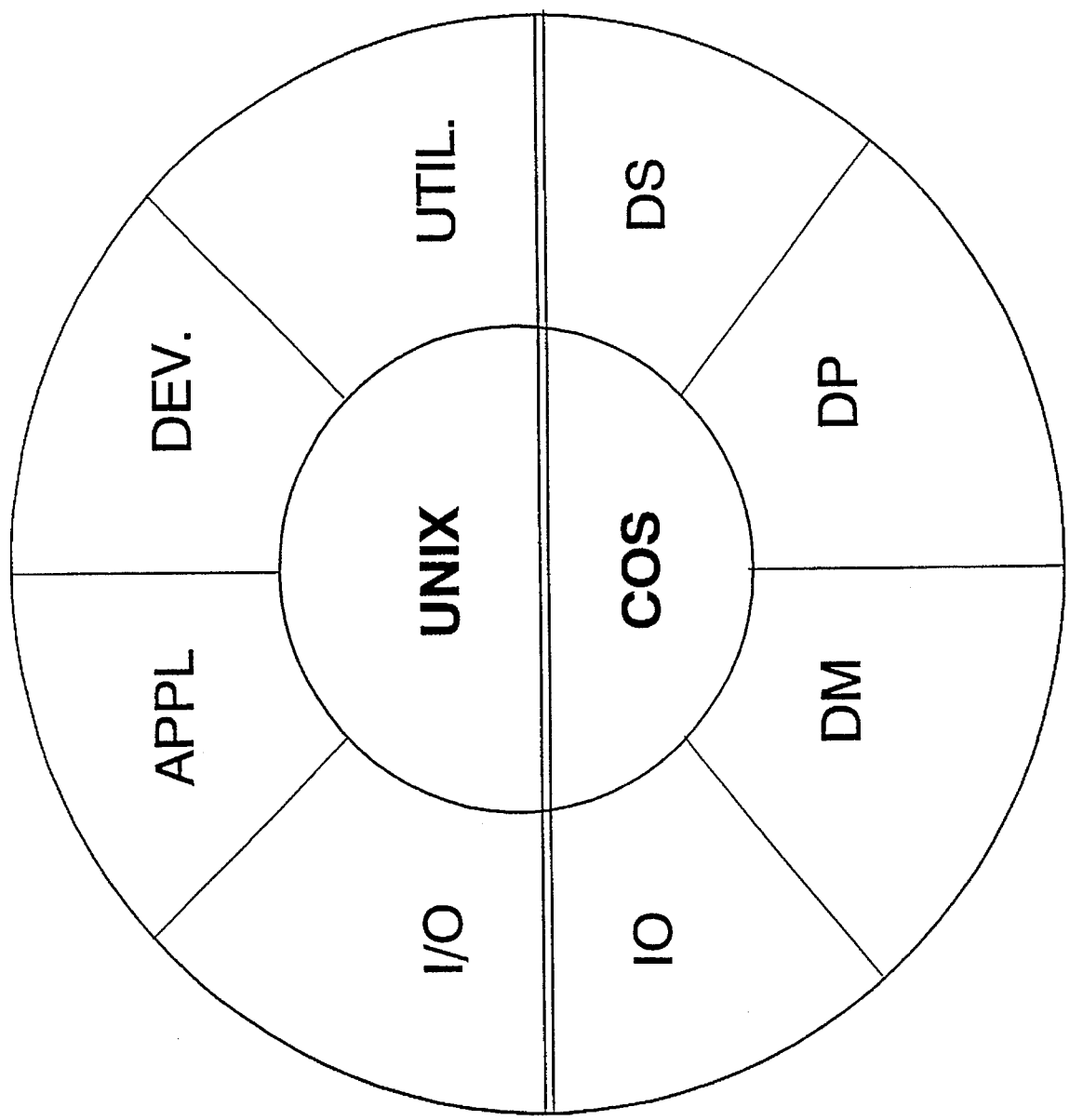
Figure 6:
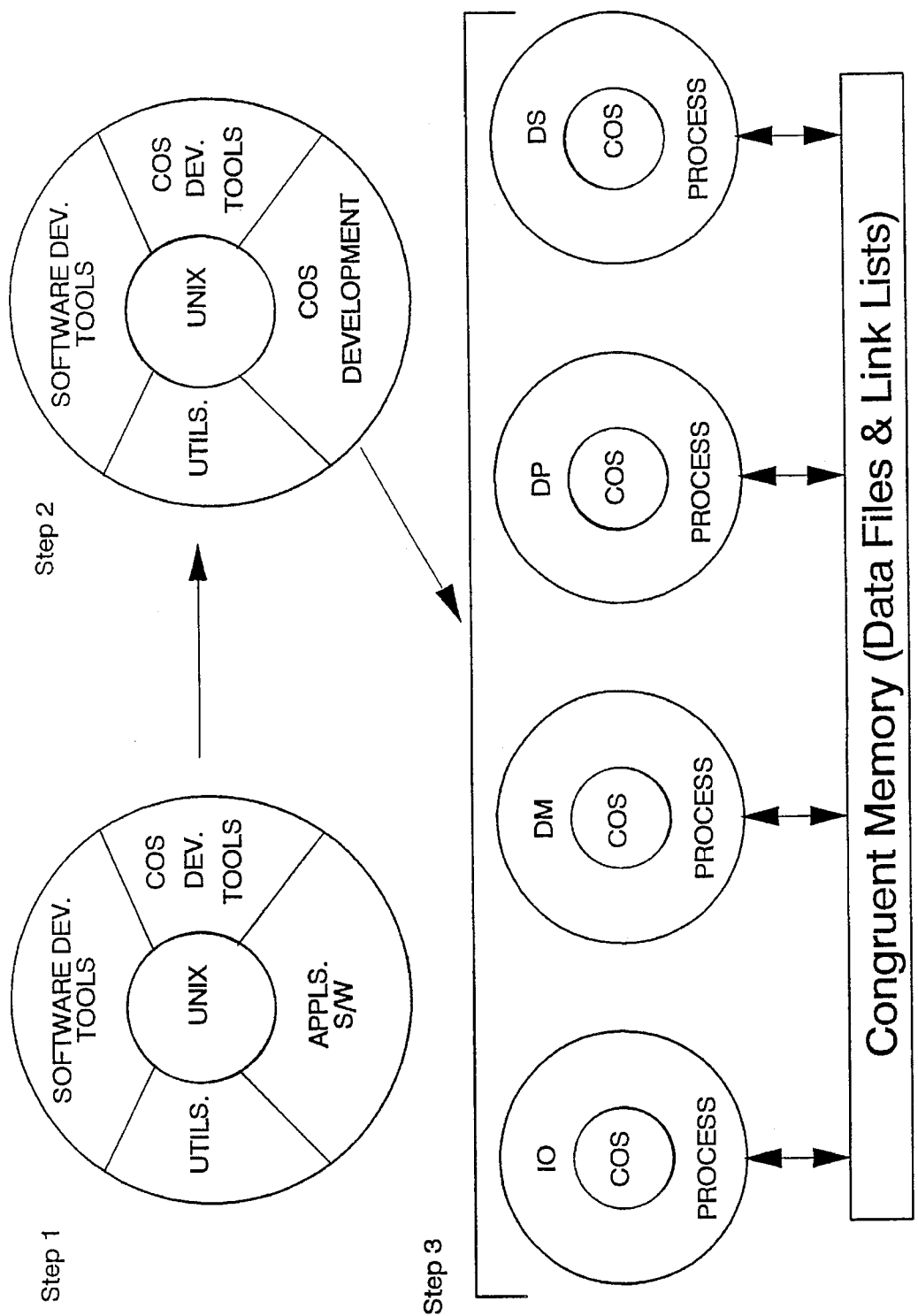

The operating system for each processor shall be an Open Systems operating system (UNIX) compatible with POSIX. Each of the Generic COS's will interface directly with the operating system Shell. Selection of the COS will be made by the operator during the Non-Operations Mode. All operational sequences will be controlled directly by the functional COS executives without Preemption from the operating system. The UNIX Shell and Interface is shown by FIG. 5, UNIX-COS Shell and Interface. The software development environment consists of an UNIX operating system, system utilities, and software development tools for developing application software in a High Order computer language, i.e. Ada. The Operational Sequence of Developing COS's is shown in FIG. 6, Operational Sequence of Developing COS's. The development environment for the C3M2 System is shown schematically in Step 1 of FIG. 6. Using such a system the processing software for the four processes, IO, DP, DS, and DM will be developed as individual processing programs. All of the unit debugging, requirements and functional testing will be done in the same development environment. Once the four processes have been tested in the development environment, each of the programs will built into self executing COS Executives using the real-time executive build tools as shown in FIG. 2. The COS Executives are capable of executing themselves without the presence of an operating system. They will be built with a minimum of system functions unlike the full functionality of an operating system. The system functions that are not required by a process are not included in the executive. Thus the COS is both a minimum of the operating system and the Processing Program in a combined state. FIG. 3 schematically shows the operational configuration of the four executives. It will have a minimum of system overhead in the utilization of system resources.

Figure 7:
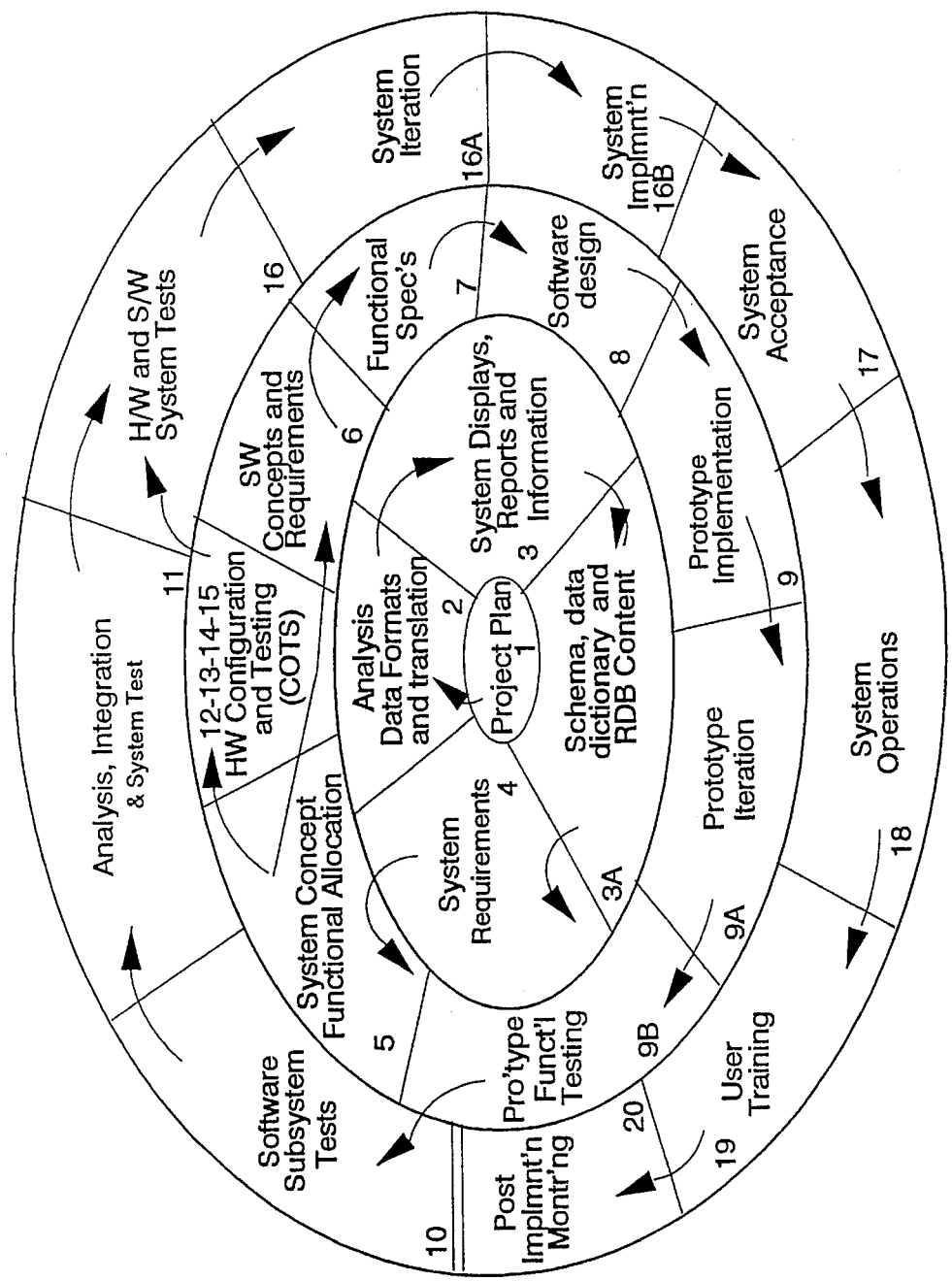
Figure 8:
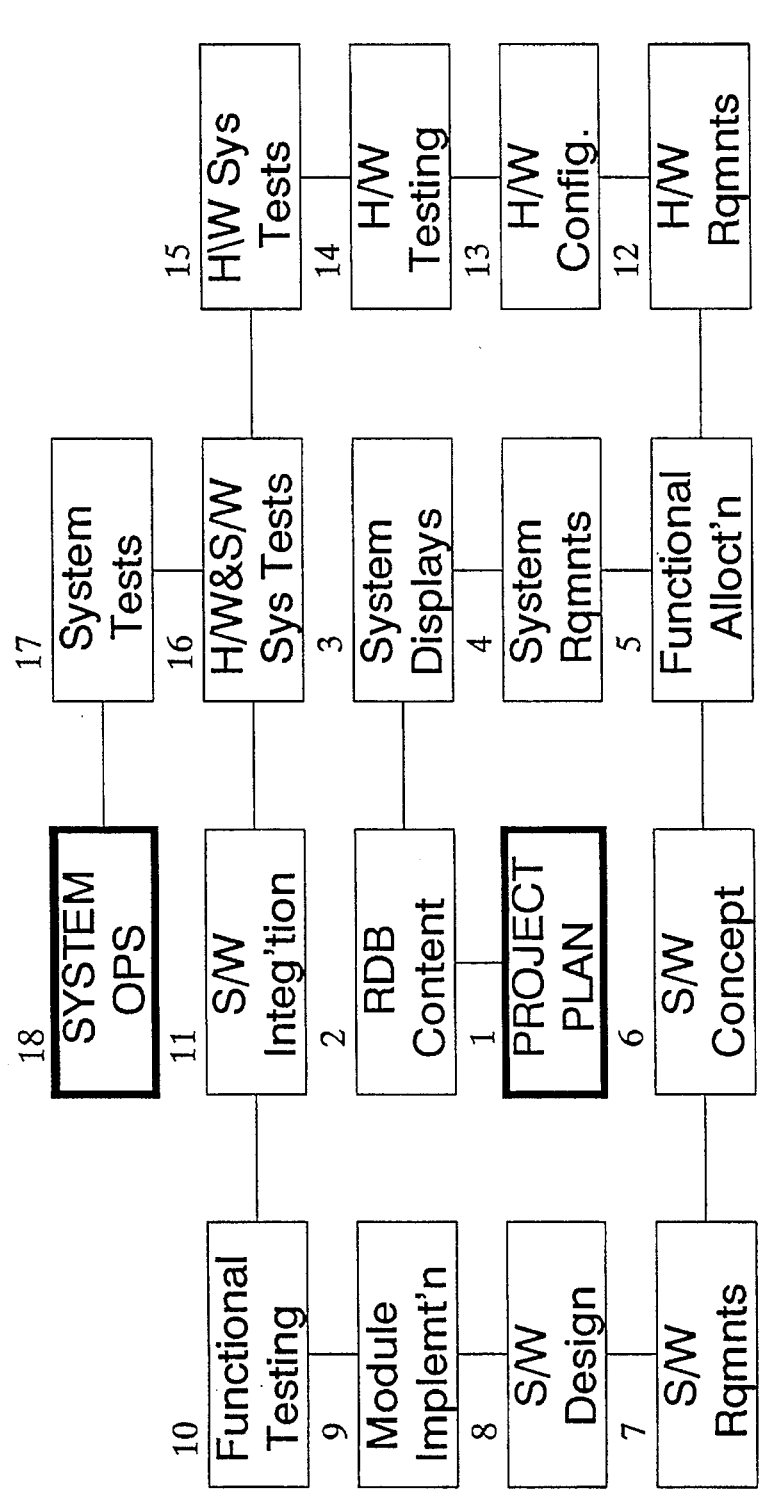

The System Design will be implemented using Rapid Prototyping Techniques (FIG. 7, C3M2 Rapid Prototyping) a "Closed Loop" Helical Scan Methodology (FIG. 8, Closed Loop C3M2 System Design Methodology). The methodology starts by defining all known data and culminates in Systems Acceptance Tests. The requirement of the system methodology to define all known facets of the system prior to writing system requirements, prevents "False Starts", takes advantage of known data, includes the User at the initial stages and allows more precise system design. This method of design allows data to be developed in a planned environment, allows use of planned facilities, and enhances the operating performance of the system. The logical procedures, of using interleaving for allocating priority to processor operations allows "Seamless" scheduling of processor tasks instead of using System Interrupts, Context Switching and Disk Swapping. The "Planned Design" will use COS's to perform the System Runs and shall not require the Preemption of the Operating System. The Major driver in "NOT" using a complete or "Run Time" Operating Systems is less System Overhead and more System operating Time.

FIG. 7 progresses through 20 evolutionary steps from start of a project to systems operations. The Proof of Concept Model will use steps one of the Project Plan through step 17, system acceptance. A brief description of each step is listed below:

1. A Project plan is implemented using a listing of the each individual work task work task that is required to finish the project. Resources that are required and available are scheduled for each work task. If current resources are not available list that work task as preliminary and track until resources are available (a schedule threat). The schedule and resources translate into the cost estimate for the labor costs. The project plan should be reviewed with all participants. Defining the work tasks for all 20 steps requires considerable effort for the Project Plan originator.

2. The resources allocated for step 2 need to itemize and document data inputs, their format, protocol and any translation required for system use. This work tasks will define all system inputs.

3. Step 3 resources define and document primitive user and system displays, reports and external user data requirements. This defines the system outputs.

3A. Step 3A uses the output of Step 2 and Step 3 to define the system processes for progressing from system inputs to system outputs. The data type for each parameter and process of transition from input to output will provide a system schema and the data dictionary for the system. The C3M2 system normally uses a Relational Data Base Record Format for storing data in the Congruent Memory (CM). One process will write its portion of the record and other processes will "Read Only". The data is persistent data in the CM until it is transferred to the archive media, where it will remain persistent until deleted.

4. System Requirements uses the outputs of task 2, task 3 and 3A to define the inputs, user requirements, system outputs, data types, protocols and the processing required for the system. The system requirements will add additional processing details, the standards to be used and combines these into a systems requirements document. The documentation will include the initial Control Flow Diagrams (CFD) and the Input Function/Process Output (IFPO) documents. After the system requirements have been reviewed and published, a System Requirements Review (SRR) is conducted. All Requirement Information Detail (RID) are reviewed and processed with a consensus opinion.

5. System concepts require the participation of System, software and hardware engineers and any required support engineers (Reliability, QA, Manufacturing and etc.). The system concept should be reviewed by all participants at the Peer Level. The system function allocation must be a consensus decision. These actions shall be documented and combine the system requirements document with the System Concept document for the documentation of a Preliminary Design Document. The Preliminary Design Review (PDR) should be conducted at this point. All COTS hardware and software should be identified at this point along with the configurations of the hardware and software. The PDR should be RID'd and resolution obtained for all comments.

6. The software portion of the PDR should be utilized in further developing the software concepts and requirements. The processing steps should add further detail in a second level IFPO. The software System concept and requirements shall be documented and reviewed at the Peer Level.

7. The software concepts, requirements, CFD's, IFPO's shall be combined to form a software Functional Specification. The Functional Specification should be reviewed at a software PDR and all action items RID'd. The system is now ready for detail design.

8. Software Design shall use the documentation commented in step 7 and add enough detail to allow coding to begin without any software Engineering steps to be taken. The CFD's and the IFPO's should be completed in enough detail to permit initiation of coding. A synopsis of the processing steps should accompany the two or three level of detail CFD's and IFPO's. The documentation shall be in enough detail to allow personnel at the same peer level to review and understand the design concept and detail design. A Final Design Review (FDR) shall be conducted at the Peer Level and all RID's resolved. The design will include the IO, DP, DS and DM applications programs and COS's.

9. Each process will be assigned to the scheduled resource for coding, compiling, module testing, linking and loading, and subsystem testing. Each process group shall prepare its own test model, develop its own test generator (using existing software products), write its own test procedure (portions to be used in the C3M2 System Test), and perform its own process subsystem testing. After subsystem testing, the processes will be integrated by the total resource group with the IO input as the system driver and the DM process being the test monitoring point. The data drivers and system outputs from subsystem testing will be used for process subsystem interface testing. Data process timing response is recorded during system response and performance test.

9A. The individual processes will be reviewed for response and performance. Iterations to the existing design will be reviewed at the Peer Level for response time or performance improvement. Any approved iteration will require a documented design and test (DAT) package. The performance of the iteration will be measured and compared with the original design. Any significant improvements or simplifications will be adopted and documented.

9B. After iterations of the processes are completed the response times of the subsystems performing in system functions (two or more processes performing as an entity) will be measured. The metrics of these test will be recorded and used in System Performance Tests. These are primarily string test of two or more processes testing the through put of processes.

10. The metrics being measured in the software subsystem tests are the system through put times of data input (DI) at the IO to record completion in the CM, DI to time of transfer to the Data Archive (DA) Media (CM), DP to KB and return, User input to the DM round trip time (DM to DS to DM) and similar metrics. These metrics will be used to test the total system response time and performance times.

11. Complete the integration of the four Processes and test the overall system performance using external test data. This verifies the system performance figures of Item No. 10.

12—13—14—15. Test the configuration of the four processors using the factory furnished system tests. Record and document the metrics of the test. Review and test the automated system tests, fault tolerance tests and Hot and Cold equipment replacements and substitution.

16. Test the system using external data sources. Record and document the system performance figures. Compare the performance figures against the overall system requirements. Perform the overall system performance figures for the number of classes and the number of objects per class that can be processed.

16A. Conduct a Peer Level Review of the Systems Performance figures and analyze the performance figures for system improvement. Provide a documented iteration for product improvement. Analyze the iteration against prior product performance or simplification. Review and adopt any significant improvement.

16B. Document the configuration after system iteration. Review the configuration with the Technical Representative (TR). Review the System Test configuration and test generators with the TR. Review the systems test with the TR. After all documentation steps are reviewed and have concurrence, schedule the System Acceptance and "Proof of Concept" systems testing.

17. Perform the Systems acceptance test and upon successful completion, provide original and copies of the Acceptance Test Sheets to the TR signifying successful completion.

The Closed Loop C3M2 System Design Methodology, FIG. 8, depicts the division of resources in choosing team members. Steps 1 through 4 are normally performed by system engineers, planning and requirements engineers. Step 5 requires system engineers, project management, hardware and software engineers. Step 5 requires a consensus of opinions and reached objectively. Steps 6 through 11 requires software engineers from Senior software engineers to engineers with Ada Programming experience. Steps 12 through 15 requires hardware engineers from the Senior hardware engineer to interface and protocol engineers. Task 16 for hardware & software System Tests requires a System Engineer Test Conductor plus hardware and software support conductors. The test are to ensure that the subsystems are integrated and meet the performance figures in the documentation. Test 17 is to be performed by the system team and is to offer proof of performance of the system.

The System and Database Management Capabilities are listed in four general categories, i.e. (1) General, (2) Basic Services, (3) Critical Computer Capability (CCC), and (4) System Services. The CCC requirements were divided into five different categories. When these requirements were added to the 3 general categories the list became 8 separate categories of capabilities.

General

Portability—The system implementation allows the system to be implemented on more than one platform.

Interoperability—The C3M2 will interface with other databases and system through standard communications interfaces or interconnects.

Supportability—The C3M2 system will use standard interfaces to the greatest extent possible.

Hardware Independent—The C3M2 system shall be independent of any particular hardware platform.

Operating System Independent—The C3M2 system shall be independent of any particular operating system.

Network Independent—The C3M2 System shall be independent of any particular network.

Programming Language Independent—The C3M2 system shall be independent of any particular programming language.

DBMS Independent—The C3M2 system shall be independent of any particular DBMS implementation.

Scalability—The C3M2 system shall accommodate changes in volume of data, number of users, or transaction rates.

Modularity—The C3M2 system shall adhere to the design principal of modularity, i.e. input/encapsulation/output. Database functions should be grouped into modules or functions that can operate and be understood independently.

Extensibility—The C3M2 system shall facilitate development and use of extensions: e.g. interfaces should be composable so that they can be combined to create new interfaces and facilities.

Uniformity—The C3M2 system shall be based on a unifying well-defined models. Interface features shall uniformly address aspects such as parameter types, formats, protocols, status return, exception conditions and options.

Configurability—The C3M2 system shall support the configurability of its components for any planned mission. The C3M2 system shall be tailored to support any planned operations.

Basic Services

Persistent data—The C3M2 system shall provide support for the management of persistent data, (Static Data).

Multiple Users—The C3M2 system shall provide support for multiple simultaneous users and application programs, all using any combination of queries, DML's, DDL's, and DCL's.

Conventional alphanumeric data types—The C3M2 system shall provide the capability to define and manipulate conventional alphanumeric data types, including integer, real and character string.

Binary Large Object (BLOB)—The C3M2 system shall provide the capability to define and manipulate BLOB's, e.g. images & maps.

Expressiveness of DML—The C3M2 system shall include a DML that allows users to easily isolate various subsets of the data held in a database. The DML shall provide for data representing multiple tables (or record types, or object types) to be meaningfully joined in a retrieval transaction.

Planned queries—The C3M2 system shall provide support for planned queries.

Ad Hoc queries—The C3M2 system shall provide support of Ad Hoc queries but not in Real-Time.

Interactive Queries—The C3M2 system shall provide support for interactive queries.

Embedded queries—The C3M2 system shall provide support for embedded queries.

Compiled queries—The C3M2 system shall provide support for complied queries.

Interpreted queries—The C3M2 system shall provide support for interpreted queries.

Transactions—The C3M2 system shall support transactions with conventional ACID properties. The shall include statements for initiating transactions and statements for committing or aborting them.

Data models—The C3M2 system shall provide DML's, DDL's, and DCL's the support conventional data models, i.e. relational and network.

Conceptual schema definitions—The C3M2 system shall provide DDL statements for defining and maintaining conceptual schemes.

External schema definition—The C3M2 system shall provide DDL statements for defining and maintaining external schemes.

Internal schema definition—The C3M2 system shall provide DDL statements for defining and maintaining internal schemes.

Identification and authentications—The C3M2 system shall provide a mechanism for identifying and authenticating users.

Discretionary access control—The C3M2 system shall support discretionary access control. The DBA shall identify which users are able to perform named specific operations with which objects.

Access to metadata—The C3M2 system shall maintain the integrity of its database by prohibiting operations that would corrupt the system, e.g. certain updates to metadata.

Multiple DBMS's—The C3M2 system shall support the presence of multiple DBMS's.

Multiple databases—The C3M2 system shall enable multiple databases to be implemented on the system, e.g., via a "create database" command.

Tracing—The C3M2 system shall provide a capability for user-readable error and transaction execution tracing.

Statistical monitoring—The C3M2 system shall provide the capability to enable and disable statistical monitoring of database usage.

Simulation and Training Mode—The C3M2 system shall support a simulation and training mode of operations in which users can exercise the C3M2 system without compromising the integrity or operational capability of the system.

Distributed query processing—The C3M2 system shall provide the capability for end users and application programmers to issue queries that access data stored at multiple computer systems.

Distributed transaction management—The C3M2 system shall provide the capability for end users and application programmers to issue transactions that access data stored at multiple computer systems. Concurrency control and recovery control shall be applied in a manner that the ACID properties of transactions are maintained despite the distribution of data.

Location transparency—The C3M2 shall access the data stored in Distributed Database Management System (DDBMS) through multiple interconnected computer systems. The distributed queries and transactions can be formulated as if the data was not distributed; they have no dependence on the locations of the data they reference.

Fragmentation transparency—The C3M2 system shall access data in a distributed database system (DDMS) that is partitioned across multiple, interconnected systems. Horizontal fragmentation occurs when the rows of a table are distributed across multiple sites, and vertical fragmentation occurs when the columns are distributed. To the end user and the application programmer, fragmentation is transparent.

Replication transparency—The C3M2 system shall enable the data in the distributed database system to be replicated at the fragment level. This means that tables, as well as horizontal and vertical fragment of tables, can be replicated. To the end user and the application programmer, the replication is transparent; distributed queries and transactions can be formulated as if the data were not replicated.

Data definition—The C3M2 system shall provide data definition facilities for control of distribution, fragmentation and replication of the data in a distributed database system. With such data definition facilities, the DBA can design a distributed database that meets the reliability, availability, and performance requirements of the application.

Local autonomous processing capability—The C3M2 system shall enable the local database system to autonomously execute local applications (programs, interactive queries, transactions). The data at each local computer system constitutes a local database. The local database and the DDBMS constitute a local database system.

Continuous operation—The C3M2 system shall provide for the continuous operation of the database system.

Remote database access—The C3M2 system shall provide the capability for a user or application programmer to remotely access heterogeneous databases.

Global transactions—The C3M2 system shall provide the capability for a user to execute global transactions. The procedure shall specify application program interfaces for communications between application programs and transaction managers, and protocols for communication between transaction mangers and resource mangers (i.e., DBMS's).

Multidatabase systems—The C3M2 system shall provide multi-database language features that enable a user or applications program integrated access to multiple, autonomous database systems.

Federated database systems—The C3M2 system shall provide capabilities for establishing federated database systems.

Modes of real-time—The C3M2 system shall provide support for hard real-time, firm real-time and soft real-time modes of operations.

Real-time transactions—The C3M2 system shall provide the capability for users to issue real-time transactions where ACID properties are applied selectively, and where start events, deadlines, periods, and criticality of real-time transactions are specified Concurrency control correctness criteria—The C3M2 system shall provide the capability to specify concurrency control correctness criteria.

Temporal consistency—The C3M2 system shall provide the capability to data temporal consistency constraints.

Real-time scheduling—The C3M2 system shall provide DBMS real-time scheduling that attempts to maximize meeting constraints and criticality of transactions, as well as attempting to maintain both logical and temporal consistency of data.

Bounded logical imprecision—The C3M2 system shall allow logical imprecision of data; it shall provide the capability to constrain these imprecisions.

Bounded temporal imprecision—The C3M2 system shall allow temporal imprecision of data; it shall provide the capability to constrain these imprecisions.

Main memory data—The C3M2 system shall provide the capability to maintain specific parts of the data base exclusively in main memory. The C3M2 shall be responsible for maintaining persistence of the main memory data.

Time fault tolerance—The C3M2 system shall support time fault tolerance. Violations of transaction timing constraints and data temporal constraints are faults and are treated as such by the fault tolerance procedures of the C3M2.

Resource Utilization Limits—The C3M2 system shall allow the specification of worst-case resource utilization limits (at least CPU time, memory, devices,and data objects) for transactions. Violation of these limits are faults and shall be treated as such by the fault-tolerance of the C3M2system.

Compilable DML—The C3M2 system shall provide a compilable DML that yields a minimal run-time burden.

Collection of fault information—The C3M2 system shall provide fault information for collection and review (e.g., system failure, the number of times this failure has occurred and when the fault occurred). Faults to be included in the total fault list include, Fault Tolerance degradation, hardware components, software modules, operations procedures, database constraint violations, transaction timing faults, and transaction resource utilization violations. Each C3M2 system shall contain built-in-test equipment (BIT) with manual and automatic operations.

Retrieval of fault information—The C3M2 system shall provide for the retrieval of C3M2 fault information.

Initiation of diagnostic tests—The C3M2 system shall provide for the initiation of C3M2 system diagnostic tests (Manual or automatically).

Retrieval of results of diagnostic tests—The C3M2 system shall provide for the storage and review capability of all automated or manually operated fault tolerance data.

Operational status—The C3M2 system shall provide access to and the monitoring of the operational status of C3M2 components.

Fault detection thresholds—The C3M2 system shall provide for the definition of all fault thresholds; which will include re-trys, time constrains, upper and lower limits, alarms and component failures.

Specification of fault responses—The C3M2 system shall provide the following actions at the occurrence of a fault. The C3M2 will support, but not limited to, the following actions:

Restart of a specified set of transactions at a database's specified past state or with only a specified part of the database replaced by its past state.

Rollback of specified transactions that have started, but not yet committed, so that their effects are not realized in the database Use of specified backup components as primary components (e.g., other versions of the database).

Providing notification of a fault to a specified set of DBMS components to allow them to initiate recovery.

Providing notification of a fault to a specified location outside of the DBMS.

Reconfigurations—The C3M2 shall support dynamic reconfiguration of the C3M2 system based on the dynamic reconfiguration of the integrated operating system and hardware. Reconfiguration is accomplished at the request of authorized users, response to faults, changes in mission requirements, changes in the operating environment.

Replicated components—The C3M2 system shall use replicated components, where applicable.

Domains—The C3M2 system shall provide the capability to define domains and to declare attributes as having values drawn from specified domains.

Keys—The C3M2 system shall provide the capability to declare a specified attribute or set of attributes as a key.

Referential integrity constraints—The C3M2 system shall provide the capability to declare referential integrity constraints.

Assertions—The C3M2 system shall provide the capability to declare assertions.

Triggers—The C3M2 system shall provide the capability to specify triggers.

Alerters—The C3M2 system shall provide the capability to specify alerters.

Enabling/disabling of constraints enforcement—The C3M2 system shall provide the capability to enable and disable the enforcement of specific integrity constraints, the C3M2 shall restrict access to this capability. Privileges shall be associated with this capability.

Null values—The C3M2 system shall provide the capability to store and retrieve null values. Null values shall be ignored in the computation of aggregate functions.

System Services

Persistent objects—The C3M2 system shall provide database management support in accordance with the concept of Object Oriented Database Management (OODM).

Object identifiers (OID)—The C3M2 system shall provide the capability to associate OID's with objects and the capability to establish a relationship between objects by reference to an OID.

Collection Data Type Constructors—The C3M2 shall provide collection data type constructors that enable users to define collection-valued attributes.

User-Defined Data Types—The C3M2 system shall provide a mechanism that enables users to define their own data types.

Sorting order—The C3M2 system shall provide the capability to specify a sorting order for given data types.

Temporal data—the C3M2 system shall provide for management of temporal data, i.e. data augmented by a time stamp (or interval) which applies.

Spatial Data—The C3M2 system shall provide for management of spatial data, i.e. data augmented by a spatial location at which its corresponding object exists.

Uncertain Data—The C3M2 system shall provide for the management of uncertain data, i.e data augmented by an indication of the likelihood that its value is accurate.

Derived Attributes—The C3M2 system shall provide a mechanism that enables users to define derived attributes.

Composite Objects—The C3M2 system shall support composite objects.

Object-Type Hierarchies—The C3M2 system shall implement inheritance and provide mechanisms for the establishment of object type hierarchies based on inheritance.

Object Encapsulation—The C3M2 system shall provide a mechanism to associate a procedure with an object in support of object encapsulation.

Versions and Configurations—The C3M2 system shall support versions and configurations.

Archival Storage—The C3M2 system shall provide management of archival storage.

Schema Evolution—The C3M2 system shall support schema evolution. That is, they shall provide facilities that enable user "to modify a schema with minimum impact on existing applications."

Long Transactions—The C3M2 shall support long transactions (Long transactions would only be accomplished during Ad Hoc Queries and not in Real-time).

Rule Processing—The C3M2 system shall support rule processing, including the enforcement of assertions, the initiation of triggers and alerters, and deductive query processing.

Domain-Specific Standards—The C3M2 system shall provide enhanced portability and inter-operability of CCC applications by adopting and endorsing domain- specific standards (media, I/F, Protocol, formats) for those data types that are expected to be common in both CCC applications and in commercial applications. These data types include: Text, Documents, Graphics, Images, Audio, Video, Multimedia, Geographic.

EXAMPLE 2

Figure 9:
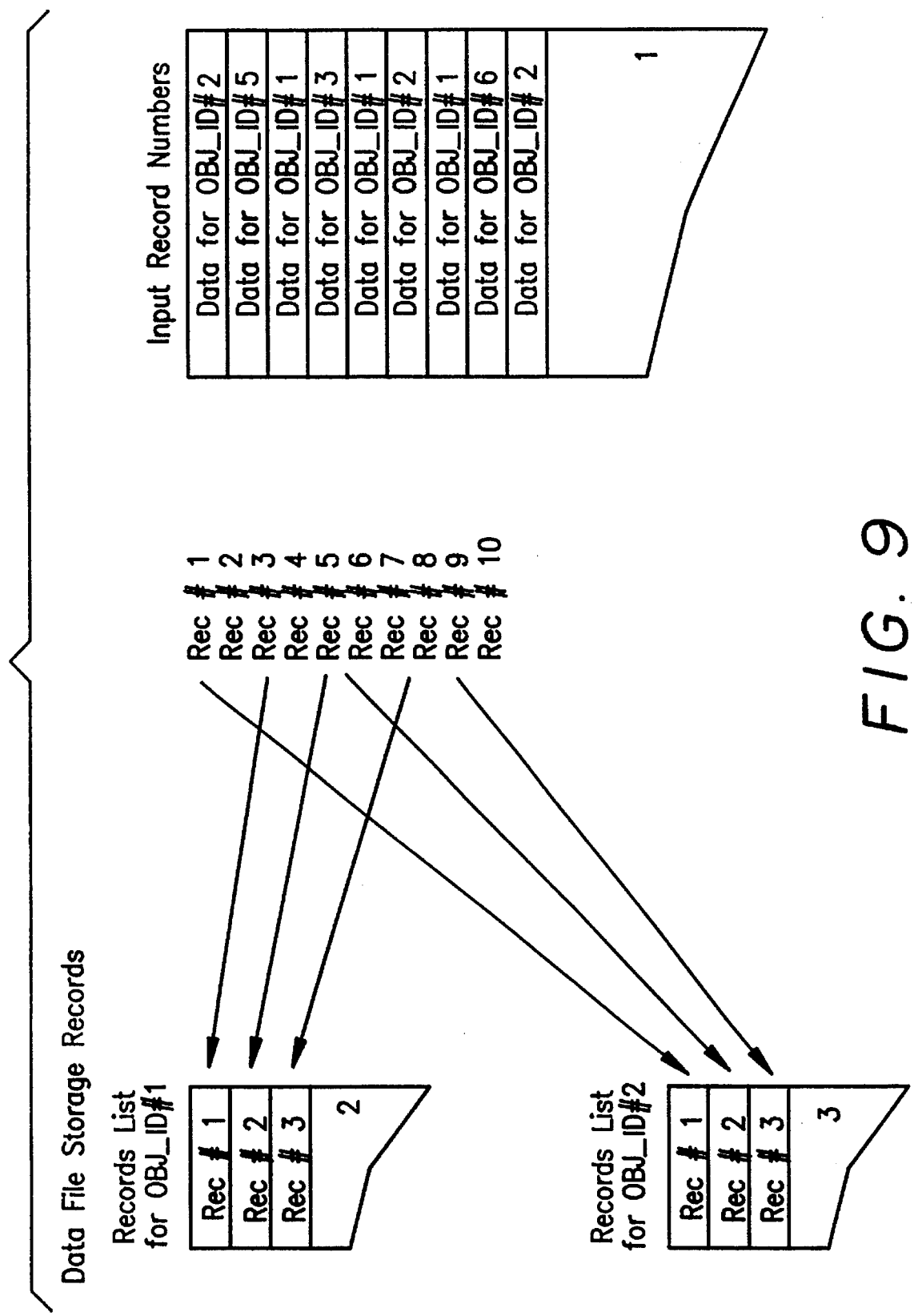

For Military use, the storage areas could be Object Data, Calculated Data, External Data, Archive Data, Link List and Count of Records. The IO writes to Object Data and External Data, the DP to Calculated Data and the DS to Archive Data. The CM Archive Data File has the attributes of a RDB. The uses of the memory is controlled by a "Link List" and Record Count does not require a "Locked" or "Un-Locked" condition. A method of assigning addresses to a Link List for Input Data is shown by FIG. 9, Link List for Input Track Data. The data is stored in the IO memory as the data arrives. A track or data record number is assigned or is identified by the IO. The Track ID number is assigned to each data record as it is stored (1). The record number is also stored on the Link List for each Track or object Id (Track & Object are interchangeable), i.e. No. (2) and (3). The records for each track numbers are also stored in the Archived Memory (CM) and Archive Media by track number in sequential time stamped locations. The track or object records are also stored in sequential order. This allows easy direct access to the individual track and data records and their attributes.

Figure 10:
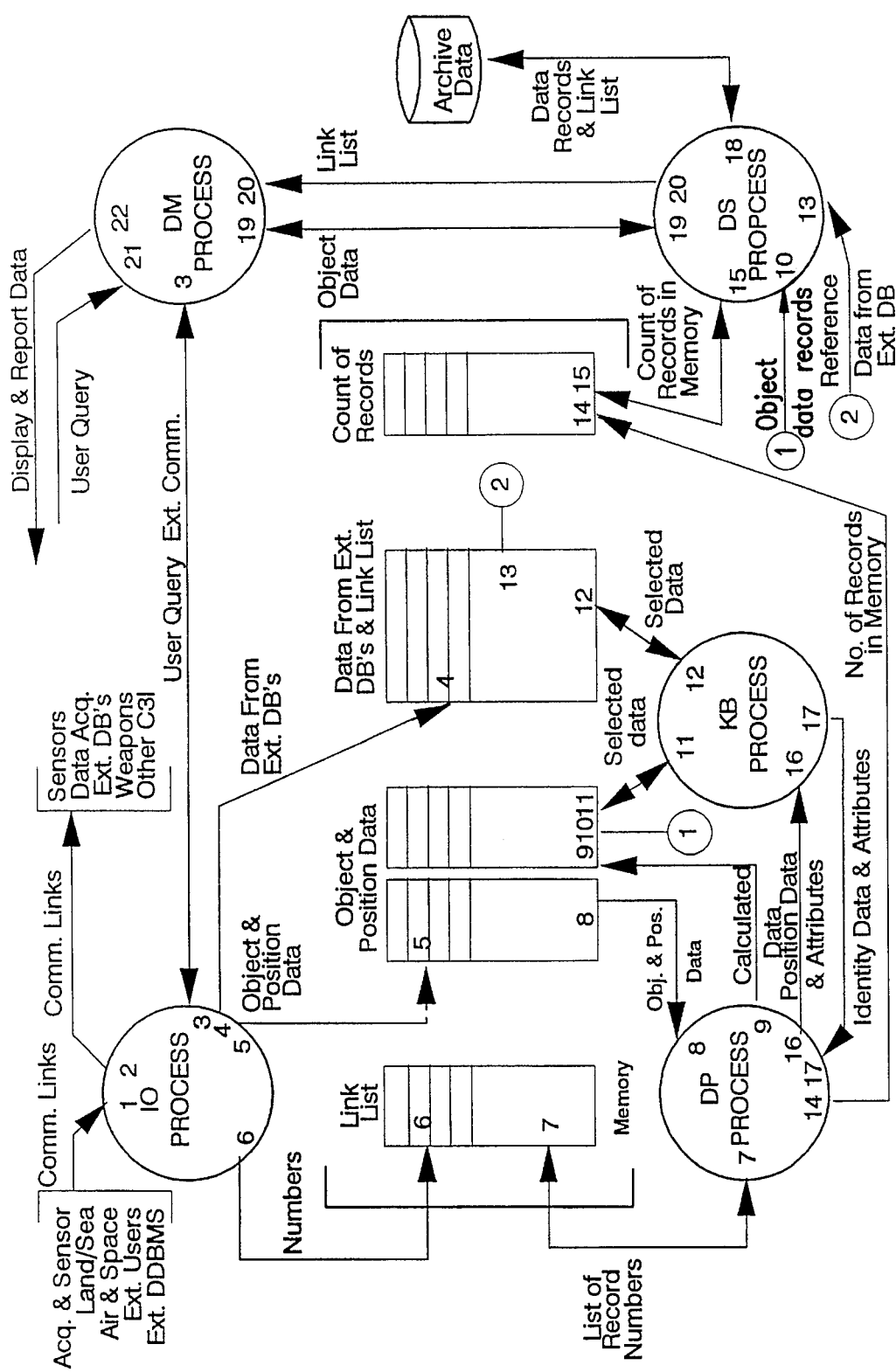

The associated users of the Congruent Memory are IO/DM, IO/DP, DM/DS, DP/DS, DP/KB. The C3M2 Function Operations Sequences (FOS) are shown by FIG. 10. The FOS description (the functional steps are numbered and the actions occurring in each step) are listed below:

1. The IO receives incoming positional data from various sources. The communications interfaces between the IO and the external source data are standard communication interfaces, preferably Safenet or FDDI.

2. The IO outputs to External Sources requesting Reference Data information and data files. It also receives any requested information and stores the data in the CM memory and provides the data to the DM for display. It also receives and displays User queries from External Sources.

3. The DM receives External User requests and Database files from External Sources. The External User requests are to obtain data from archived files. The external files are to provide data from external database sources.

4. The data received by the IO from various external databases and stored in the common access memory will be organized according to object, target and track identifications. Link lists will be maintained so that the data pertaining to an object, a target or a track can be accessed from this data in an optimum fashion.

5. The IO stores this data in the Congruent Memory (CM). The positional or object data shall form a part of the data record for a record. The storage in the CM is allocated to have fixed locations to store data for up to the maximum number of planned tracks. For each track, a maximum number of planned records (influenced by identity time) can be stored in the access memory at any one time. The DS monitors the number of records stored in the access memory for every track and when it is equal to the maximum prescribed, it will archive that data to an archive medium (main memory and archive media). The corresponding memory locations will then become available for new data.

6. The IO builds a list of records it has stored in the CM. The List of Records built by the IO is a sequential file with pointers to the record numbers and their status flag. The status flag is whether the DP has yet to process this record or it has already been processed. The list consists of the record number pointers to the data stored by the IO.

7. The DP processes each record in the same order as in the list and sets the status flag enabling the IO to use that place in the list when needed. When either the IO or the DP reaches the end of the list (which is of a pre-determined and fixed size), it will go to the beginning of the list. When IO reaches the end of the list, the DP, working behind the IO, resets the status flags for the records. The list is always available for IO additions.

8. The DP monitors the list of records stored in the memory by the IO for records containing only the object or positional data and selects the next record for processing. The DP uses the object or positional data for each of the records stored in the memory for processing, i.e. the calculation of components of velocity, acceleration, etc.

9. The DP calculates the components of velocity, acceleration and change in acceleration for each of the records, resets the status flag, and adds this data to its records as Calculated Data. The DP processes these records in the same order as the pointers in the list built by the IO, i.e. the same order as received and stored by the IO.
10. Whenever the number of records in the memory for a track reaches the prescribed number, the DS writes the records to the Archive Memory. The DS then sets the number of records stored in Calculated Memory to zero, making that memory storage available for further storage. The DS continuously monitors the list of record count generated by the DP and the DS to decide which data is ready for archiving in the CM and Archive Media.
11. The KB will analyze the object and track data from the Calculated and External database, upon request from the DP, and returns the results to the DP.
12. The KB will also add to the track or object data any pertinent information that is useful, from the external databases.
13. The DS receives External User Queries and DB Data from External Sources. The User Queries are to request data from the archived files. The RDA data is to provide reference data and display data of DDBM's to the C3M2 User Queries. Data Storage for all external RDA data and it's associated Linked List are in a partitioned area of the CM.
14. The DP maintains a record count in the CM which indicates the number of records that are stored in the CM for each track.
15. The list maintained by the DP indicates the number of completed records that are stored in the memory for each track. The maximum number of records for each class of objects is defined during the Planning Phase.
16. The DP will request the KB to attempt to identify Track or Object data based on the Object or track number and its attributes.
17. The KB will attempt to identify the Object or Track depending on its attributes and the reference data obtained from external sources. The external sources could include signature data for the attributes.
18. The DS monitors the record number completed by the DP and writes these records to direct access sequential records in a RDB file array. It also maintains a link list of all the records for each track. Each of these link lists represents the records for one object or track plus its time stamp. It contains the pointers to all the records belonging to that track, pre and post archive. These link lists are also written to the archive medium at regular intervals.
19. The DM accesses the desired data from the archived data records using the link list for identity of the user requested track.
20. The DM, on receipt of the requested data records, provides the requested data records to the user.
21. Whenever the user wants to obtain data from the C3M2 system, the user provides his query to the DM.
22. The DM continuously accesses all the current track or object data, alarm or alert data and provides all required data to the users. The DM provides initial and updates for all users and displays, as requested.

What is claimed is:

1. A computer system comprising
    four processors, four memories, and a set of instructions for each processor, wherein the four processors comprise
        an IO processor for receiving data inputs and processing said data inputs to provide data outputs;
        a DP processor for performing a data processing function;
        a DM processor for performing a data distribution function; and
        a DS processor for performing a data storage function;
    wherein the four memories comprise
        at least one memory means for storing data from the IO processor;
        a dedicated DP memory for storing data from the DP processor;
        a dedicated DM memory for storing data from the DM processor; and
        a dedicated DS memory for storing data from the DS processor;
    and wherein the set of instructions for each processor comprises
        IO instructions and means for causing the IO processor to transfer data outputs to the at least one memory means for storage;
        DP instructions and means for causing the DP processor to retrieve dam from the at least one memory, process said data to form calculated data; and to transfer the calculated data to the DP memory for storage;
        DM instructions and means for causing the DM processor to retrieve data from the DS memory and to transfer the data retrieved to the DM memory for storage; and
        DS instructions and means for causing the DS processor to retrieve data from at least one of the memory means for storing data from the IO processor and the DP memory and to transfer the retrieved data to the DS memory for storage.

2. A computer system as in claim 1 wherein the at least one memory means for storing data from the IO processor comprises
    a DP cache memory operably associated with the DP processor; and
    a dedicated IO memory for storing data from the IO processor;
    said computer system further comprising
        IO instructions and means for causing the IO processor to transfer data outputs to the DP cache memory and to the dedicated IO memory;
        wherein the DP instructions and means for causing the DP processor to retrieve data from a memory causes the DP processor to retrieve data from the DP cache memory, and
        the DS instructions and means for causing the DS processor to retrieve data from at least one of the memory means for storing data from the IO processor causes the DS processor to retrieve data from the dedicated IO memory.

3. A computer system as in claim 2 wherein
    each data output from the IO processor is associated with a unique multicharacteristic identifier, and
    the dedicated IO memory includes
        a first memory portion for storing dynamic data;
        a second memory portion for storing static data; and
        a third memory portion for storing the multicharacteristic identifiers for the dynamic data and the static data.

4. A computer system as in claim 3 wherein the DS memory includes
    a first memory portion for storing dynamic data, static data and calculated data grouped by a characteristic of the identifier associated with such data;

a second memory portion for storing the identifiers for the dynamic data, the static data and the calculated data; and the DS instructions further cause the DS processor to reformat the retrieved data based on identifier characteristic and to transmit the reformatted data for storage in the DS memory.

5. A computer system as in claim 3 further comprising a knowledgebase comprising
   a KB processor and means for the KB processor to receive calculated data having a common identifier characteristic from the DP processor, perform a prediction function based on data trends for the data having the common identifier characteristic and produce a deviation signal when the calculated data from the DP processor is outside of predetermined limits from the value predicted by the KB processor;
   a KB memory for storing response information appropriate for each of a plurality of deviation signals; and
   instructions and means for causing the KB processor to retrieve the appropriate response information from the KB memory in response to the deviation signal and to transfer such response information to the DP processor.

6. A computer system as in claim 1 further comprising
an archive memory for storing data for archive from the DS processor;
instructions and means for causing the DS processor to retrieve data for archive from the first memory portion of the DS memory and the second memory portion of the DS memory and to transfer such data to the archive memory for storage.

7. A computer system as in claim 3 wherein
the multicharacteristic identifier includes an object number and a receipt time for each data input; and
the DM instructions further cause the DM processor to reformat the retrieved data for the production of user notices, and to transfer the reformatted data to the DM memory for storage.

8. A computer system as in claim 1 further comprising
a user interface operably associated with the DM processor;
wherein the DM instructions include
   a routine for determining whether a user notification should be transmitted to the user interface;
   a routine for generating the user notification; and
   a routine for transmitting the user notification from the DM processor to the user interface.

9. A computer system as in claim 1 further comprising
an external user interface operably associated with the IO processor;
wherein the IO instructions include
   a routine for processing queries from the external user interface;
   a routine for transmitting the processed queries from the external user interface to the DM processor;
   a routine for processing query responses received from the DM processor; and
   a routine for transmitting the processed query responses to the external user interface;
   and wherein the DM instructions include
      a routine for processing queries received from the IO processor;
      a routine for retrieving data responsive to said query from the DM memory;
      a routine for generating a query response based on the retrieved data; and
      and a routine for transmitting the query response to the IO processor.

10. A computer system as in claim 3 wherein the IO instructions include a routine for assigning a processing priority designator to data inputs; and a routine for scheduling the data inputs for ordered transmission to the DP processor in a priority scheduler having a cyclic unvarying predetermined priority designator sequence.

11. A computer system as in claim 10 wherein the computer system has a clock cycle speed and the sequence is selected based on said clock cycle speed so that the computer system has completed retrieval, processing and transmission to the DM memory of a first data sample having a common identifier characteristic prior to receipt by the IO processor of a second data sample having such common identifier characteristic.

12. A computer system as in claim 1 wherein
the IO instructions and means for causing the IO processor to transfer data to the IO memory for storage further comprises a routine for causing a flag to be placed with the transferred data; and
the DP instructions and means for causing the DP processor to retrieve data from a memory and to transfer calculated data to the DP memory for storage further comprises a routine for removing the flag from the retrieved data and a routine for placing a flag with the transferred data.

13. A computer system as in claim 2 wherein
the DP instructions and means for causing the DP processor to retrieve data from the DP cache memory, process said data to form calculated data and to transfer the calculated data to the DP memory for storage further comprises a routine for transferring the calculated data to the DP cache memory for storage.

14. A computer system as in claim 13 wherein the DP instructions further comprise a routine for establishing a relationship between a most recently formed calculated data and a previously formed calculated data in the DP cache memory, generating a data value representative of such relationship, and transferring such value to the DP memory for storage.

15. A computer system as in claim 1 further comprising
a user interface operably associated with the DM processor;
wherein the DM instructions include
   a routine for processing queries from the user interface;
   a routine for retrieving data responsive to said query from the DM memory;
   a routine for generating a query response based on the retrieved data; and
   and a routine for transmitting the query response to the user interface.

16. A computer system as in claim 2 further comprising
an IO cache memory operably associated with the IO processor;
a data source operably associated with the IO cache memory, said data source transmitting object data and external I/F data to the IO cache memory for storage;
wherein the IO instructions include
   a routine to retrieve object data from the IO cache memory;
   a routine to retrieve external I/F data from the IO cache memory;
   a routine for identifying the source, class and type of data formats and associated data parameters;

a routine to transfer the object data to the IO memory for storage; and
a routine to transmit queried data to external users.

17. A computer system as in claim 1 further comprising
an IO cache memory operably associated with the IO processor;
a DM cache memory operably associated with the DM processor;
an external user interface operably associated with the IO processor;
external user interface instructions and means for causing the external user interface to transmit queries to the IO cache memory for storage; and
a dedicated external user interface memory operably associated with the external user interface;
wherein the IO instructions include
   a routine to retrieve queries from the IO cache memory;
   a routine to format the queries in an appropriate protocol;
   a routine to identify and transmit the queries to the DM cache memory for storage;
   a routine to retrieve query responses from the DM cache memory;
   a routine to format the query responses from the DM cache memory into the protocol;
   a routine to transmit the queries and the query responses to the external user interface memory for storage.

18. A computer system as in claim 2 wherein
the DP instructions include
   a routine for calculating a value for a predetermined relationship between data most recently retrieved from the DP cache memory and data previously retrieved from the DP cache memory;
   a routine for transferring the value to the DP cache memory for storage;
   a routine for calculating a calculated value trend from the stored values;
   a routine for predicting a predicted value for the next retrieved data based on the trend from the stored values;
   a routine for comparing the calculated value with the predicted value and completing further processing of the calculated value when the calculated value is outside of predetermined limits from the predicted value; and
   a routine for transferring the calculated value from the DP cache memory to the DP memory for storage.

19. A computer system as in claim 1 further comprising
a DS cache memory operably associated with the DS processor;
an archive memory for storing data for archive from the DS processor;
wherein the DS instructions and means for causing the DS processor to retrieve data from IO memory causes the DS processor to retrieve such data into the DS cache memory:
   wherein the DS instructions further include
      a routine to retrieve dynamic data from the DS cache memory;
      a routine to retrieve static data from the DS cache memory;
      a routine to retrieve calculated data from the DS cache memory;
      a routine to retrieve the identifiers for the dynamic data, the static data, and the calculated data from the DS cache memory;
      a routine to convert the identifiers to record numbers;
      a routine to convert the dynamic data, the static data, the calculated data and the record numbers to a relational data base format for storage as a relational data base;
      a routine for storing the relational data base in the DS memory;
      a routine for retrieving the relational data base from the DS memory;
      a routine for storing the thus retrieved relational data base in the archive memory;
      a routine for transferring the relational data base from the archive memory to an archive media for storage; and
      a routine for transferring a relational data base from an archive media to the archive memory.

20. A computer system as in claim 1 further comprising:
a DM cache memory operably associated with the DM processor; and
a user interface operably associated with the DM processor;
and wherein the DM instructions include
   a routine to retrieve data from the DS memory and to transfer the data retrieved to the DM cache memory for storage;
   a routine to cause a flag to be placed with the data last retrieved from the DS memory;
   a routine to transmit the data stored with the flag to the user interface;
   a routine for determining whether a user notification should be transmitted to the user interface;
   a routine for generating the user notification; and
   a routine for transmitting the user notification from the DM processor to the user interface.

21. A computer system as in claim 1 further comprising:
a DM cache memory operably associated with the DM processor; and
a user interface operably associated with the DM processor;
at least one external database operably associated with the DM processor;
wherein the DM instructions include
   a routine for processing queries received from the user interface;
   a routine for identifying the external database containing data responsive to said query;
   a routine for retrieving the data responsive to said query from the external database;
   a routine for generating a query response based on the retrieved data; and
   and a routine for transmitting the query response to the user interface.

22. A computer system as in claim 3 wherein
the IO instructions further include
   a routine for causing the IO processor to assign a multicharacteristic identifier to each data input;
   a routine for causing the IO processor to transmit the multicharacteristic identifier to the third memory portion of the IO memory.

23. A computer system as in claim 12 wherein
the DM instructions and means for causing the DM processor to retrieve data from the DS memory and to transfer the retrieved data to the DM memory further comprises a routine for removing the flag from the retrieved data and a routine for placing a flag with the transferred data; and the DS instructions and means for causing the DS processor to retrieve data from the IO memory and the DP memory and to transfer the retrieved data to the DS memory for storage further comprises a routine for removing the flag from the retrieved data and a routine for placing a flag with the transferred data.

24. A process for concurrently using four processors to cooperatively perform complementary data processing functions, said process comprising receiving a data input in an IO processor;

processing the data input in the IO processor and producing an IO output;

transferring the IO output to an IO memory for storage;

transferring the IO output to a DP cache memory for storage;

retrieving an IO memory output from the IO memory;

receiving the retrieved IO memory output in a DS processor;

processing the received IO memory output in the DS processor and producing a DS output;

transferring the DS output to a DS memory for storage;

retrieving a DP cache memory output from the DP cache memory;

receiving the DP cache memory output in a DP processor;

processing the received DP cache memory output in the DP processor and producing a DP output;

transferring the DP output to the DP cache memory;

transferring the DP output to a DP memory for storage;

retrieving an DP memory output from the DP memory;

receiving the retrieved DP memory output in a DS processor;

processing the received DP memory output in the DS processor and producing a DS output;

transferring the DS output to the DS memory for storage;

retrieving a DS memory output from the DS memory;

receiving the retrieved DS memory output in a DM processor;

processing the received DS memory output in the DM processor and producing a DM output;

transferring the DM output to a DM memory for storage.

25. A process as in claim 24 further comprising assigning a processing priority designator to data inputs to the IO processor; and scheduling the data outputs from the IO processor for ordered transmission to the DP processor in a priority scheduler having a cyclic unvarying predetermined priority designator sequence.

26. A process as in claim 24 further comprising causing a flag to be placed with the IO output transferred to the IO memory for storage;

causing a flag to be placed with the IO output transferred to the DP cache memory for storage;

causing a flag to be placed with the DP output transferred to the DP memory for storage;

causing a flag to be placed with the DS output transferred to the DS memory for storage; and causing a flag to be placed with the DM output transferred to the DM memory for storage.

27. A process as in claim 24 further comprising:

calculating a value for a predetermined relationship between data most recently retrieved from the DP cache memory and data previously retrieved from the DP cache memory;

transferring the value to the DP cache memory for storage;

calculating a calculated value trend from the stored values;

predicting a predicted value for the next retrieved data from the DP cache memory based on the trend from the stored values;

comparing the calculated value with the predicted value and completing further processing of the calculated value when the calculated value is outside of predetermined limits from the predicted value; and transferring the calculated value from the DP cache memory to the DP memory for storage.

28. A process as in claim 24 further comprising:

processing a query from a user interface;

retrieving DM memory output responsive to said query from the DM memory;

generating a query response based on the retrieved DM memory output in the DM processor; and transmitting the query response to the user interface.

29. A process as in claim 24 further comprising assigning a unique multicharacteristic identifier to each data input to the IO processor;

transferring the multicharacteristic identifier as IO output to the IO memory for storage; and transferring the multicharacteristic identifier as IO output to the DP cache memory for storage.

30. A process as in claim 24 further comprising identifying dynamic data in the IO processor;

identifying static data in the IO processor;

transferring the dynamic data as IO output to a first portion of the IO memory for storage;

transferring the static data as IO output to a second portion of the IO memory for storage; and transferring the multicharacteristic identifiers as IO output to a third portion of the IO memory for storage.

31. A process as in claim 30 further comprising retrieving an IO memory output from the first portion of the IO memory;

retrieving an IO memory output from the second portion of the IO memory;

retrieving an IO memory output from the third portion of the IO memory;

receiving the retrieved IO memory outputs in the DS processor;

reformatting the received IO memory outputs in the DS processor and producing a reformatted DS output; and transferring the reformatted DS output to the DS memory for storage.

32. A process as in claim 24 further comprising determining in the DM processor whether a user notification should be transmitted to a user interface;

generating the user notification; and transmitting the user notification from the DM processor to the user interface.

* * * * *